United States Patent
Perry

(10) Patent No.: US 11,342,951 B2
(45) Date of Patent: *May 24, 2022

(54) PORTABLE COMMUNICATIONS SYSTEM

(71) Applicant: Matthew L. Perry, Rockland, ME (US)

(72) Inventor: Matthew L. Perry, Rockland, ME (US)

(*) Notice: Subject to any disclaimer, the term of this patent is extended or adjusted under 35 U.S.C. 154(b) by 58 days.

This patent is subject to a terminal disclaimer.

(21) Appl. No.: 17/065,398

(22) Filed: Oct. 7, 2020

(65) Prior Publication Data
US 2021/0105032 A1 Apr. 8, 2021

Related U.S. Application Data

(60) Provisional application No. 62/911,492, filed on Oct. 7, 2019.

(51) Int. Cl.
| H04B 1/08 | (2006.01) |
| H04B 1/034 | (2006.01) |
| H04B 1/04 | (2006.01) |
| H04B 1/16 | (2006.01) |

(52) U.S. Cl.
CPC ............. *H04B 1/086* (2013.01); *H04B 1/034* (2013.01); *H04B 1/04* (2013.01); *H04B 1/1607* (2013.01); *H04B 2001/0408* (2013.01)

(58) Field of Classification Search
CPC .......... H04B 1/086; H04B 1/034; H04B 1/04; H04B 1/1607; H04B 2001/0408
See application file for complete search history.

(56) References Cited

U.S. PATENT DOCUMENTS

| 8,483,755 | B2 * | 7/2013 | Kumar | H04M 1/72409 455/556.1 |
| 2009/0224057 | A1 * | 9/2009 | Chen | H04M 1/72412 235/492 |
| 2015/0028797 | A1 * | 1/2015 | Miller | H02J 7/342 320/103 |
| 2017/0230907 | A1 * | 8/2017 | Rose | H04B 1/1036 |
| 2019/0182779 | A1 * | 6/2019 | Niu | H01Q 1/247 |
| 2020/0220256 | A1 * | 7/2020 | Cetinoneri | H04B 1/0458 |
| 2020/0364187 | A1 * | 11/2020 | Tran | G06Q 20/02 |

* cited by examiner

Primary Examiner — Janice N Tieu

(57) ABSTRACT

Disclosed herein is a portable communications system comprising an enclosure configured to house a plurality of components, a plurality of component holders attached to the enclosure, at least one wiring arrangement electrically coupled to the plurality of component holders, an internal power source configured to provide electrical energy to at least one component of the plurality of components, at least one input power connector configured to connect with a plurality of external power sources, a plurality of output power connectors configured to connect with a plurality of external electrical loads, a power selector switch, at least one power converter configured to convert electrical power from a first voltage level to a second voltage level, at least one transceiver comprising a plurality of antenna, at least one input device configured to receive input from a user, and at least one output device configured to present output to the user.

20 Claims, 30 Drawing Sheets

PORTABLE COMMUNICATIONS SYSTEM

FIELD OF THE INVENTION

Generally, the present disclosure relates to the field of data communication. More specifically, the present disclosure relates to a portable communications system.

BACKGROUND OF THE INVENTION

Conventional communication systems are often contained in soft sided bags. These bags provide no protection for the various components which are often damaged. Inexpensive soft sided bags or carrying cases do not provide the protection needed by many emergency communication agencies, and/or hobbyists and can lead to damage of the communications equipment rendering it inoperable. On the other hand, professional communications equipment along with their large, heavy, trunks or large padded cases containing individual components are too cumbersome to use in the field, often requiring trained personnel and crew to setup and operate. Attempting to assemble and connect components in the field, in potentially inclement weather can result in the risk of improper component or wiring connections and significant time delays in communicating urgent emergency information or the relaying of non-emergency but important, relevant and necessary information.

In many situations, a radio operator is a single person without a support team and is required to setup a station quickly in an emergency to relay communications. When setting up a system quickly (and often in challenging weather) in emergency situations, radio operators have relied upon homemade bags, boxes, attachments, and accessories, which are often made out of available materials such as household items, scavenged parts, duct tape, and then mounted to cardboard boxes or cutting boards. These temporary solutions are specific to each radio operator's ingenuity for a particular situation and must be disassembled once the emergency subsides or the needs or available equipment changes. A significant amount of time, energy and resources is wasted trying to fabricate and/or reconfigure a communications package for different situations, which may result in longer, less efficient time out in the field and increased risk to the operator.

While there are portable communications in the art, they are limited in many aspects. They are configured for a limited amount of protection, mounting and positioning options, and are unable to work with different systems and setups, resulting in the potential for multiple assemblies and dis-assemblies and the radio operator needing multiple configurations for each portable situation, location or type of emergency.

Therefore, there is a need for an improved portable communications system with digital data communication capabilities in an impact resistant, wet rated carrying case with modular mounting systems that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a portable communications system is disclosed. The portable communications system may include an enclosure configured to house a plurality of components. Further, the enclosure may include a plurality of sidewalls forming an interior space. Further, the plurality of sidewalls is water resistant and impact resistant. Further, the portable communications system may include a plurality of component holders attached to the enclosure. Further, the plurality of component holders is configured to detachably attach with the plurality of components. Further, the plurality of component holders may include a plurality of electrical terminals configured to electrically contact with a plurality of component terminals comprised in the plurality of components. Further, the portable communications system may include at least one wiring arrangement electrically coupled to the plurality of component holders. Further, the at least one wiring arrangement forms an electrical connection between at least one first electrical terminal of a first component holder and at least one second electrical terminal of a second component holder. Further, the portable communications system may include an internal power source configured to provide electrical energy to at least one component of the plurality of components. Further, the internal power source is attached to the enclosure. Further, the portable communications system may include at least one input power connector configured to connect with a plurality of external power sources. Further, the at least one input power connector is electrically coupled to the at least one wiring arrangement. Further, the at least one input power connector is disposed over at least one sidewall of the plurality of sidewalls. Further, the portable communications system may include a plurality of output power connectors configured to connect with a plurality of external electrical loads. Further, the plurality of output power connectors is electrically coupled to the at least one wiring arrangement. Further, the plurality of output power connectors is disposed over at least one sidewall of the plurality of sidewalls. Further, the portable communications system may include a power selector switch electrically coupled with each of the at least one input power connector, the plurality of output power connectors, the internal power source and an internal power distribution network. Further, the power selector switch is configured to selectively connect at least one of the at least one input power connector and the internal power source with at least one of the plurality of output power connectors and the internal power distribution network. Further, the at least one wiring arrangement may include the internal power distribution network. Further, the portable communications system may include at least one power converter configured to convert electrical power from a first voltage level to a second voltage level. Further, the at least one power converter is electrically coupled to the at least one input power connector and the internal power distribution network. Further, the portable communications system may include at least one transceiver comprising a plurality of antenna. Further, the at least one transceiver is configured to receive signals and transmit signals. Further, the at least one transceiver is configured to be detachably attached to the plurality of component holders. Further, the portable communications system may include at least one input device configured to receive input from a user. Further, the at least one input device is configured to be detachably attached to the plurality of component holders. Further, the at least one input device is communicatively coupled to the at least one transceiver through the at least one wiring arrangement. Further, the portable communications system may include at least one output device configured to present output to the user. Further, the at least one output device is configured to be detachably attached to the plurality of component holders. Further, the at least one output device is communicatively coupled to the at least one transceiver through the at least one wiring arrangement.

According to some embodiments, a portable communications system is disclosed. The portable communications system may include an enclosure configured to house a plurality of components. Further, the enclosure may include a plurality of sidewalls forming an interior space. Further, the plurality of sidewalls may be water resistant and impact resistant. Further, the portable communications system may include at least one frame attached to at least one inner surface of the plurality of sidewalls. Further, the portable communications system may include at least one mounting plate attached to the at least one frame. Further, the at least one mounting plate may be configured to mount the plurality of components. Further, the portable communications system may include a plurality of component holders attached to the at least one mounting plate. Further, the plurality of component holders may be configured to detachably attach with the plurality of components. Further, the plurality of component holders may include a plurality of electrical terminals. Further, the portable communications system may include at least one wiring arrangement electrically coupled to the plurality of component holders. Further, the at least one wiring arrangement forms an electrical connection between at least one first electrical terminal of a first component holder and at least one second electrical terminal of a second component holder. Further, the portable communications system may include a plurality of external antenna connections configured to mount a plurality of external antenna. Further, the plurality of external antenna connections may be disposed over at least one sidewall of the plurality of sidewalls. Further, the plurality of external antenna connections may be electrically coupled to the at least one wiring arrangement. Further, the portable communications system may include an internal power source configured to provide electrical energy to at least one component of the plurality of components. Further, the internal power source may be attached to the at least one frame. Further, the portable communications system may include at least one input power connector configured to connect with a plurality of external power sources. Further, the at least one input power connector may be electrically coupled to the at least one wiring arrangement. Further, the at least one input power connector may be disposed over at least one sidewall of the plurality of sidewalls. Further, the portable communications system may include a plurality of output power connectors configured to connect with a plurality of external electrical loads. Further, the plurality of output power connectors may be electrically coupled to the at least one wiring arrangement. Further, the plurality of output power connectors may be disposed over at least one sidewall of the plurality of sidewalls. Further, the portable communications system may include a power selector switch electrically coupled with each of the at least one input power connector, the plurality of output power connectors, the internal power source and an internal power distribution network. Further, the power selector switch may be configured to selectively connect at least one of the at least one input power connector and the internal power source with at least one of the plurality of output power connectors and the internal power distribution network. Further, the at least one wiring arrangement; may include the internal power distribution network. Further, the portable communications system may include at least one power converter configured to convert electrical power from a first voltage level to a second voltage level. Further, the at least one power converter may be electrically coupled to the at least one input power connector and the internal power distribution network. Further, the portable communications system may include a plurality of power meters configured to measure a plurality of power consumptions corresponding to the plurality of components. Further, the plurality of power meters may be further configured to present a plurality of indications corresponding to the plurality of power consumptions. Further, the plurality of power meters may be electrically coupled to the internal power distribution network. Further, the portable communications system may include a plurality of antenna configured to intercept radio waves corresponding to a plurality of frequency bands. Further, the plurality of antenna may be configured to be detachably attached to the plurality of component holders. Further, the portable communications system may include a plurality of receivers communicatively coupled to the plurality of antenna through the at least one wiring arrangement. Further, the plurality of receivers may be configured to receive signals based on the interception of the radio waves. Further, the plurality of receivers may be configured to be detachably attached to the plurality of component holders. Further, the portable communications system may include a plurality of transmitters communicatively coupled to the plurality of antenna through the at least one wiring arrangement. Further, the plurality of transmitters may be configured to transmit signals over the plurality of frequency bands through the plurality of antenna. Further, the plurality of transmitters may be configured to be detachably attached to the plurality of component holders. Further, the portable communications system may include at least one input device configured to receive input from a user. Further, the at least one input device may be configured to be detachably attached to the plurality of component holders. Further, the at least one input device may be communicatively coupled to the plurality of transmitters through the at least one wiring arrangement. Further, the portable communications system may include at least one output device configured to present output to the user. Further, the at least one output device may be configured to be detachably attached to the plurality of component holders. Further, the at least one output device may be communicatively coupled to the plurality of receivers through the at least one wiring arrangement.

According to some embodiments, a portable communications system is disclosed. Further, the portable communications system may include an enclosure configured to house a plurality of components. Further, the enclosure may include a plurality of sidewalls forming an interior space. Further, the plurality of sidewalls may be water resistant and impact resistant. Further, the portable communications system may include at least one frame attached to at least one inner surface of the plurality of sidewalls. Further, the portable communications system may include at least one mounting plate attached to the at least one frame. Further, the at least one mounting plate may be configured to mount the plurality of components. Further, the portable communications system may include a plurality of component holders attached to the at least one mounting plate. Further, the plurality of component holders may be configured to detachably attach with the plurality of components. Further, the plurality of component holders may include a plurality of electrical terminals. Further, the portable communications system may include at least one wiring arrangement electrically coupled to the plurality of component holders.

Further, the at least one wiring arrangement forms an electrical connection between at least one first electrical terminal of a first component holder and at least one second electrical terminal of a second component holder. Further, the at least one wiring arrangement may include a plurality of power lines electrically coupling a power terminal of each component holder to an internal power distribution network. Further, the plurality of power lines may include a positive line and a negative line. Further, the at least one wiring arrangement may include a plurality of receive lines electrically coupling a receive terminal of each component holder. Further, the plurality of receive lines may be further electrically coupled with the plurality of external antenna connections. Further, the at least one wiring arrangement may include a plurality of transmit lines electrically coupling a transmit terminal of each component holder. Further, the plurality of transmit lines may be further electrically coupled with the plurality of external antenna connections. Further, the portable communications system may include a plurality of external antenna connections configured to mount a plurality of external antenna. Further, the plurality of external antenna connections may be disposed over at least one sidewall of the plurality of sidewalls. Further, the plurality of external antenna connections may be electrically coupled to the at least one wiring arrangement. Further, the portable communications system may include an internal power source configured to provide electrical energy to at least one component of the plurality of components. Further, the internal power source may be attached to the at least one frame. Further, the portable communications system may include at least one input power connector configured to connect with a plurality of external power sources. Further, the at least one input power connector may be electrically coupled to the at least one wiring arrangement. Further, the at least one input power connector may be disposed over at least one sidewall of the plurality of sidewalls. Further, the portable communications system may include a plurality of output power connectors configured to connect with a plurality of external electrical loads. Further, the plurality of output power connectors may be electrically coupled to the at least one wiring arrangement. Further, the plurality of output power connectors may be disposed over at least one sidewall of the plurality of sidewalls. Further, the portable communications system may include a power selector switch electrically coupled with each of the at least one input power connector, the plurality of output power connectors, the internal power source and the internal power distribution network. Further, the power selector switch may be configured to selectively connect at least one of the at least one input power connector and the internal power source with at least one of the plurality of output power connectors and the internal power distribution network. Further, the at least one wiring arrangement may include the internal power distribution network. Further, the portable communications system may include at least one power converter configured to convert electrical power from a first voltage level to a second voltage level. Further, the at least one power converter may be electrically coupled to the at least one input power connector and the internal power distribution network. Further, the portable communications system may include a plurality of power meters configured to measure a plurality of power consumptions corresponding to the plurality of components. Further, the plurality of power meters may be further configured to present a plurality of indications corresponding to the plurality of power consumptions. Further, the plurality of power meters may be electrically coupled to the internal power distribution network. Further, the portable communications system may include a plurality of antenna configured to intercept radio waves corresponding to a plurality of frequency bands. Further, the plurality of antenna may be configured to be detachably attached to the plurality of component holders. Further, the portable communications system may include a plurality of receivers communicatively coupled to the plurality of antenna through the at least one wiring arrangement. Further, the plurality of receivers may be configured to receive signals based on the interception of the radio waves. Further, the plurality of receivers may be configured to be detachably attached to the plurality of component holders. Further, the portable communications system may include a plurality of transmitters communicatively coupled to the plurality of antenna through the at least one wiring arrangement. Further, the plurality of transmitters may be configured to transmit signals over the plurality of frequency bands through the plurality of antenna. Further, the plurality of transmitters may be configured to be detachably attached to the plurality of component holders. Further, the portable communications system may include at least one input device configured to receive input from a user. Further, the at least one input device may be configured to be detachably attached to the plurality of component holders. Further, the at least one input device may be communicatively coupled to the plurality of transmitters through the at least one wiring arrangement. Further, the portable communications system may include at least one output device configured to present output to the user. Further, the at least one output device may be configured to be detachably attached to the plurality of component holders. Further, the at least one output device may be communicatively coupled to the plurality of receivers through the at least one wiring arrangement.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
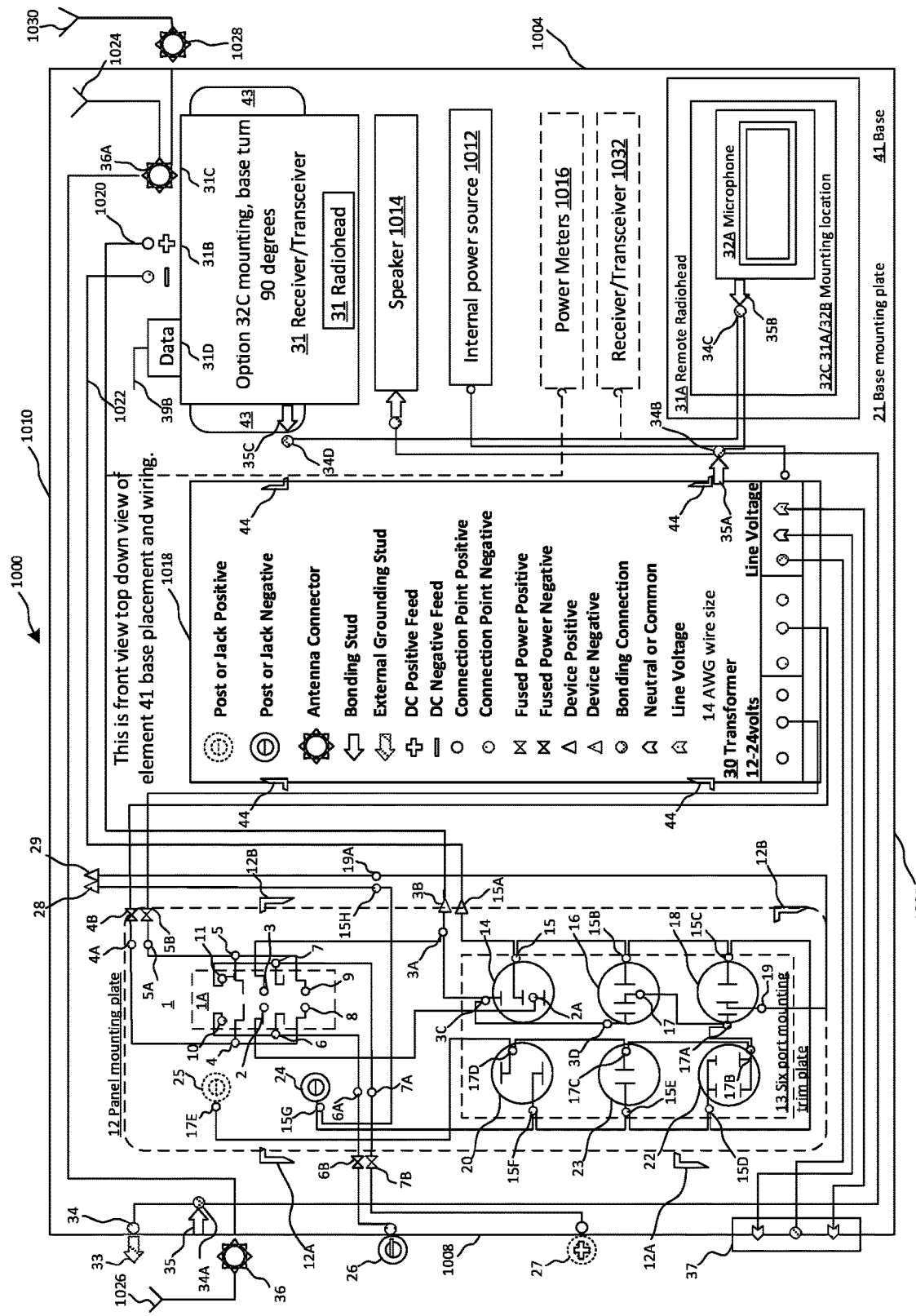
FIG. 1 is a block diagram of a base of a portable communications system and a wiring arrangement, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of portable communications systems, embodiments of the present disclosure are not limited to use only in this context.

According to some embodiments, a portable communications system with digital data communication capabilities in an impact resistant, wet rated carrying case with modular mounting systems is disclosed.

According to some embodiments, a portable, reliable and affordable communication system preassembled in an impact resistant, wet rated carrying case with optional digital communication capability for single and larger teams is disclosed. The communication system offers protection, portability, reliability and mounting capabilities that accepts and receives a variety transceivers and accessories. Further, the communication system is rapidly reconfigurable and interchangeable, to adapt to different environments and unforeseen events, where the devices and equipment are designed to be modified, removed and/or changed out in the field as a particular situation dictates.

According to some embodiments, a portable communications system with digital data communication capabilities in an impact resistant, wet rated carrying case with modular mounting systems is disclosed. Further, the portable communications system may include a wet rated enclosure with external antenna connection, an external mount line voltage power socket, 120-240 volt 15-20-amp AC, along with 12 volts 20-amp DC voltage external power connection (to energize either line voltage or low voltage power demands) being utilized by a double-pole double-throw rocker master selector switch, which controls metering and monitors devices utilizing power, with communication devices in parallel. The portable communications system may offer power outputs to multiple device types of 12 volts. The power output devices are mounted internally on a panel mounting plate with the flexibility to mix and match devices. All equipment may be designed to be easily modified, removed and/or changed out in the field.

Further, the portable communications system may also be used for powering other demands, such as cellphones, base radios, portable radio chargers, ham radio equipment, a battery charger, or a solar battery by using the external power ports. Further, the portable communications system may have the ability to power ham radio equipment used in single side band shortwave radio frequency 50 MHZ to 1300 MHZ, along with 28 MHZ to 1.800 MHZ using an appropriately matched antenna 50 MHZ to 1300 MHZ, as well as 28 MHZ to 1.800 MHZ.

Figure 2:
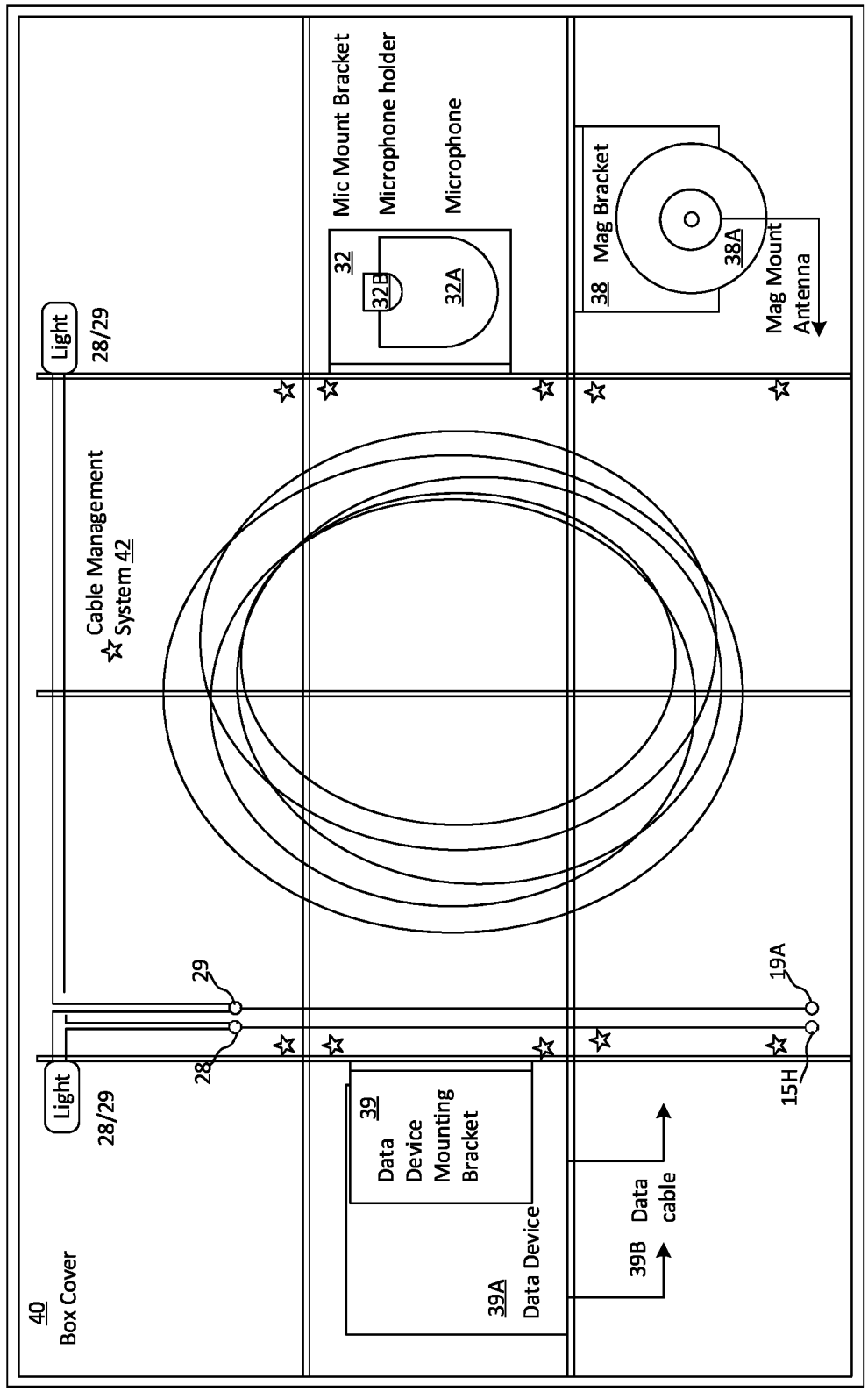
FIG. 2 is a block diagram of a cover of the portable communications system and a wiring arrangement, in accordance with some embodiments.
Figure 3:
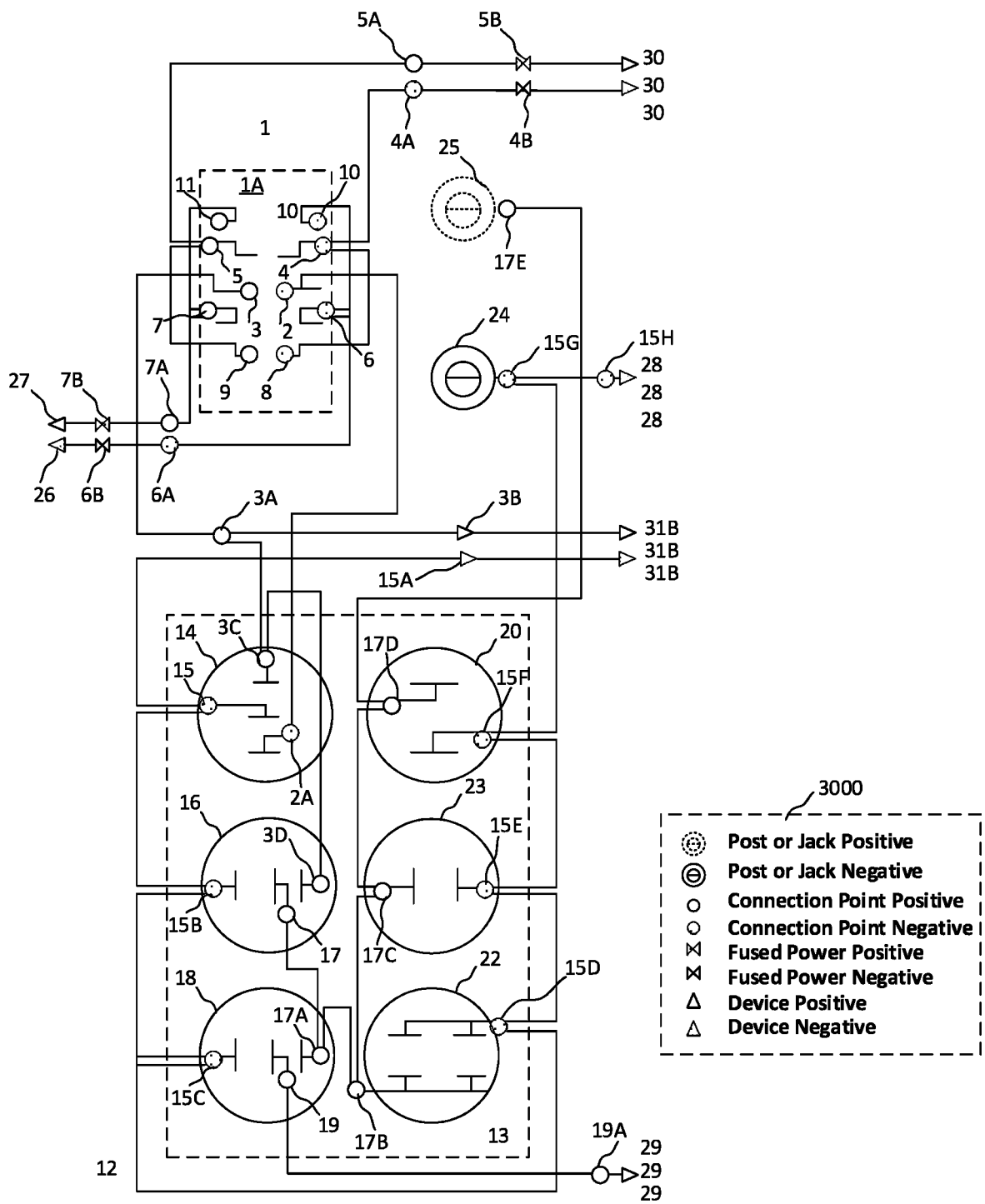
FIG. 3 is a block diagram of the backside of control panel wiring of a panel mounting plate of the portable communications system, in accordance with some embodiments.

FIG. 1 is a block diagram of a base 41 of a portable communications system 1000, in accordance with some embodiments. A legend 1018 is shown in FIG. 1. The legend 1018 may be placed on a suitable surface available in the base 41. FIG. 2 is a block diagram of a cover 40 of the portable communications system 1000, in accordance with some embodiments. FIG. 3 is a block diagram of the backside of control panel wiring of a panel mounting plate 12 of the portable communications system 1000, in accordance with some embodiments. A legend 3000 is shown in FIG. 3.

The portable communications system 1000 may include an enclosure 1002 configured to house a plurality of components (such as power sources, transceivers, receivers, antenna, sound cards, data devices, cables and devices). Further, the enclosure 1002 may include a plurality of sidewalls 1004-1010 forming an interior space. Further, the plurality of sidewalls 1004-1010 may be water resistant and impact resistant.

Further, the portable communications system 1000 may include a plurality of component holders (such as, component holders 32B and 39) attached to the enclosure 1002. Further, the plurality of component holders (such as the component holders 32B and 39) may be configured to detachably attach with the plurality of components. Further, the plurality of component holders (such as the component holders 32B and 39) may include a plurality of electrical terminals configured to electrically contact with a plurality of component terminals comprised in the plurality of components.

Further, the portable communications system 1000 may include at least one wiring arrangement (such as wiring arrangements 28 and 29) electrically coupled to the plurality of component holders (such as the component holders 32B and 39). Further, the at least one wiring arrangement (such as the wiring arrangements 28 and 29) may form an electrical connection between at least one first electrical terminal of a first component holder and at least one second electrical terminal of a second component holder.

Further, the portable communications system 1000 may include an internal power source 1012 configured to provide electrical energy to at least one component of the plurality of components. Further, the internal power source 1012 may be attached to the enclosure 1002.

Further, the portable communications system 1000 may include at least one input power connector (such as an input power connector 37) configured to connect with a plurality of external power sources. Further, the at least one input power connector (such as the input power connector 37) may be electrically coupled to the at least one wiring arrangement (such as the wiring arrangements 28 and 29). Further, the at least one input power connector (such as the input power connector 37) may be disposed over at least one sidewall of the plurality of sidewalls 1004-1010.

Further, the portable communications system 1000 may include a plurality of output power connectors (such as output power connectors 26-27) configured to connect with a plurality of external electrical loads. Further, the plurality of output power connectors (such as the output power connectors 26-27) may be electrically coupled to the at least one wiring arrangement (such as the wiring arrangements 28 and 29). Further, the plurality of output power connectors (such as the output power connectors 26-27) may be disposed over at least one sidewall of the plurality of sidewalls 1004-1010.

In some embodiments, the plurality of output power connectors (such as the output power connectors 26-27) may include an external mount line voltage power socket configured to connect with an external line connector configured to connect to an Alternating Current (AC) power source and an external DC voltage power connection configured to connect with an external Direct Current (DC) power source.

Further, the portable communications system 1000 may include a power selector switch 1 electrically coupled with each of the at least one input power connector (such as the input power connector 37), the plurality of output power connectors (such as the output power connectors 26-27), the internal power source 1012 and an internal power distribution network 1020-1022. Further, the power selector switch 1 may be configured to selectively connect at least one of the at least one input power connector (such as the input power connector 37) and the internal power source 1012 with at least one of the plurality of output power connectors (such as the output power connectors 26-27) and the internal power distribution network 1020-1022. Further, the at least one wiring arrangement (such as the wiring arrangements 28 and 29) may include the internal power distribution network 1020-1022.

In some embodiments, the power selector switch 1 may include a double-pole double-throw on-off-on illuminated rocker switch.

Further, the portable communications system 1000 may include at least one power converter (such as a transformer 30) configured to convert electrical power from a first voltage level to a second voltage level. Further, the at least one power converter (such as the transformer 30) may be electrically coupled to the at least one input power connector (such as the input power connector 37) and the internal power distribution network 1020-1022.

Further, the portable communications system 1000 may include at least one transceiver (such as a transceiver 31) comprising a plurality of antenna 1024-1026. Further, the at least one transceiver (such as the transceiver 31) may be configured to receive signals and transmit signals. Further, the at least one transceiver (such as the transceiver 31) may be configured to be detachably attached to the plurality of component holders (such as the component holders 32B and 39).

Further, the portable communications system 1000 may include at least one input device (such as a microphone 32A) configured to receive input from a user. Further, the at least one input device (such as the microphone 32A) may be configured to be detachably attached to the plurality of component holders (such as the component holders 32B and 39). Further, the at least one input device (such as the microphone 32A) may be communicatively coupled to the at least one transceiver (such as the transceiver 31) through the at least one wiring arrangement (such as the wiring arrangements 28 and 29).

Further, the portable communications system 1000 may include at least one output device (such as a speaker 1014, and LED lighting elements 28-29) configured to present output to the user. Further, the at least one output device (such as the speaker 1014 and the LED lighting elements 28-29) may be configured to be detachably attached to the plurality of component holders (such as the component holders 32B and 39). Further, the at least one output device (such as the speaker 1014 and the LED lighting elements 28-29) may be communicatively coupled to the at least one transceiver (such as the transceiver 31) through the at least one wiring arrangement (such as the wiring arrangements 28 and 29).

In further embodiments, the portable communications system 1000 may include at least one frame (such as frames 12A, 12B, 44) attached to at least one inner surface of the plurality of sidewalls 1004-1010. Further, the portable communications system 1000 may include at least one mounting plate (such as mounting plates 12, 21) attached to the at least one frame (such as the frames 12A, 12B, 44). Further, the at least one mounting plate (such as the mounting plates 12, 21) may be configured to mount the plurality of components. Further, the plurality of component holders (such as the component holders 32B and 39) may be attached to the at least one mounting plate (such as the mounting plates 12, 21).

In some embodiments, the plurality of component holders (such as the component holders 32B and 39) may include at least one bracket (such as a bracket 43 shown in FIGS. 6-12) configured to be fastened with the at least one mounting plate (such as the mounting plates 12, 21) using at least one fastener.

In some embodiments, the plurality of component holders (such as the component holders 32B and 39) may include a magnetic bracket (such as a magnet bracket 38 shown in FIG. 2) configured to be magnetically coupled to the at least one mounting plate (such as the mounting plates 12, 21).

In some embodiments, the at least one wiring arrangement (such as the wiring arrangements 28 and 29) may include a plurality of jump wires (such as the cable management system 42). Further, each jump wire may include a first connector and a second connector and a conductive member connecting the first connector and the second connector.

Further, the at least one wiring arrangement (such as the wiring arrangements 28 and 29) may include a plurality of jump wire connectors (such as the cable management system 42) electrically coupled to a plurality of electrical terminals corresponding to the plurality of component holders (such as the component holders 32B and 39). Further, the plurality of jump wire connectors (such as the cable management system 42) may be configured to be electrically connected to each of the first connector and the second connector of the plurality of jump wires (such as the cable management system 42).

In some embodiments, the at least one wiring arrangement (such as the wiring arrangements 28 and 29) may include a plurality of power lines 1020-1022 electrically coupling a power terminal of each component holder to the internal power distribution network 1020-1022. Further, the plurality of power lines 1020-1022 may include a positive line and a negative line.

Further, the at least one wiring arrangement (such as the wiring arrangements 28 and 29) may include a plurality of receive lines (such as cable management system 42) electrically coupling a receive terminal of each component holder. Further, the plurality of receive lines (such as the cable management system 42) may be electrically coupled with a plurality of external antenna connections (such as antenna connections 36 and 1028).

Further, the at least one wiring arrangement (such as the wiring arrangements 28 and 29) may include a plurality of transmit lines (such as the cable management system 42) electrically coupling a transmit terminal of each component holder. Further, the plurality of transmit lines (such as the cable management system 42) may be electrically coupled with the plurality of external antenna connections (such as the antenna connections 36 and 1028).

In further embodiments, the at least one wiring arrangement (such as the wiring arrangements 28 and 29) may include a plurality of data lines (such as data/timing cable 39B) electrically coupling a data terminal of each component holder. Further, a data line (such as the data/timing cable 39B) may communicate digital data from a first data terminal of the first component holder to a second data terminal of the second component holder. Further, the plurality of components may include a plurality of data cards (such as a data device 39A). Further, the first component holder may be configured to receive a first data card and the second component holder is configured to receive a second data card.

Further, the at least one wiring arrangement (such as the wiring arrangements 28 and 29) may include a plurality of timing lines (such as the data/timing cable 39B) electrically coupling a timing terminal of each component holder. Further, a timing line (such as the data/timing cable 39B) may communicate at least one timing signal from a first timing terminal of the first component holder to a second timing terminal of the second component holder.

In some embodiments, the portable communications system 1000 may include a plurality of power meters 1016 configured to measure a plurality of power consumptions corresponding to the plurality of components. Further, the plurality of power meters 1016 may be configured to present a plurality of indications corresponding to the plurality of power consumptions. Further, the plurality of power meters 1016 may be electrically coupled to the internal power distribution network 1020-1022.

FIGS. 1-3 include following items such as switch rocker 1 on/off/on double-pole double-throw (illuminated); Rocker switch holder 1A; switch load connection negative 2 8-in to 2A; switch feed connection negative 2A; switch load connection positive 3 8-in to 3A butt splice, with crimped 3B, 3C; junction point butt splice positive direct feed 3A to transceiver, 3B fuse to 31B, 3C meter, on/off switch 30 feed panel (feed wiring harness) Order 8-in, 8-in, 8-in, 4-in; device connection powerpole 3B 8-in from 3A to 31B transceiver; connection point feed 3C for meter 14, feedout to switch 3D, connection point feed 3D for switch 16, switch feed connection Internal power supply 4, 12 volt negative 8-in to 4A connection point then to 4B fuse; connection point 4A from 4B fuse then to 30 internal power supply; fuse holder negative 4B 10-in, from 4A to 30 internal power; switch feed connection internal power supply 5 12-volt, positive 8-in to 5A connection point to 5B; Connection point 5A from 5 to 5B fuse then to 30 internal power supply; Fuse holder positive 5B 10-in, from 5A to 30 internal power supply; Switch feed connection 6 External power supply 12 volt, negative 8-in to 6A connection point to 6B; Connection point 6A from 6 to 6B fuse then to 26 external power supply; Fuse holder negative 6B 10-in from 6A to 26 external power; Switch feed connection 7 external power supply 12 volt, positive, 8-in to 7A connection point to 7B; Connection point 7A from 7 to 7B fuse then to external power supply 27; Fuse holder positive 7B 10-in from 7A to 27 external power; Pilot light 8 for internal power from 4 negative 3-inch; Pilot light 9 for internal power from 5 positive 3-inch; Pilot light 10 for internal power from 6 negative 3-inch; Pilot light 11 for internal power from 7 positive 3-inch; Mounting plate control panel 12; Panel mounting left ell brackets 12A; Panel mounting right ell brackets 12B; Mounting plate 6 port device holder 13; Device digital meter, voltage and amperage 14; Connection point digital meter 14 negative load. Negative wiring harness 15, in and out: 15A, B, C, D, E, F, G, H. Order 8-in, 4-in, 4-in, 4-in, 4-in, 4-in, 8-in, 8-in; Device connection powerpole 15A 8-in from 15 to 31B transceiver; Connection point to switch on/off 15B 16-4 in; Connection point to switch on/off 15C 18-4 in; Connection point to powerpole panel mount 15D 22-4 in.; Connection point to 12 volt power socket 15E 23-4 in.; Connection point to USB charging ports 15F 20-4 in.; Connection point to binding post 15G 20-4 in.; Connection point to led light 15H 8-in 28 female to male; Device switch on/off for panel power 16; Connection point to switch 16 positive load 4-in. Positive wiring harness 17, in and out: 17A, B, C, D, E. Order 4-in, 4-in, 4-in, 4-in, 8-in; Connection point to switch 17A 18 4-in.; Connection point to powerpole panel mount 17B 22-4-iN.; Connection point to 12 volt power socket 17C 23-4-in.; Connection point USB charging ports 17D 20-4-in.; Connection point to binding post 17E 25-8-in.; Device switch on/off light for light 18; Connection point to led light positive 19 8-in to 19A to 29; Connection point positive 19A to 29 36-in, Device USB charging port 20, Mounting plate base 21 (See FIGS. 1, 5, 27-28); Device powerpole panel mount 22 2×3" positive, 2×3" negative; Device power socket 23 12 volt; Device binding post panel mount negative 24 8"; Device binding post panel mount positive 25 8"; Device external mount binding post or jack negative 26; Device external mount binding post or jack positive 27; Fixture LED light 28 24" negative from 15H (See FIG. 2), Fixture LED light 29 24" positive from 19A (See FIG. 2); Device internal mount power supply 30 12 volt (See FIG. 1); Device transceiver option 31 to powerpole connectors 3B, 15A (See FIG. 1); Transceiver remote radiohead option 31A (See FIGS. 1, 5); Transceiver power tee connection 31B (See FIG. 1); Antenna connection 31C (See FIG. 1); Transceiver data port connection 31D (See FIG. 1); Microphone mounting ell bracket 32 (See FIGS. 2, 4, 13-18); Microphone option 32A (See FIGS. 1, 2); Microphone holder 32B (See FIGS. 1, 2, 4, 5); Alternate mounting option 31A/32B 32C (See FIGS. 1, 2, 4, 5); External mount grounding stud connection 33 (See FIGS. 1, 5); Ground connection to 34A, 34B, 34C, 34D (See FIG. 1) Order 4"; 22"; 8"; 4". 34; Ground jumper to 36 antenna bulkhead 34A (See FIG. 1); Ground jumper to 30 transformer 34B (See FIG. 1); Ground jumper 34C to 31A remote radio head or 32B microphone holder (See FIG. 1); Ground jumper 34D to 31 transceiver (See FIG. 1); Internal ground stud connections 35 35A, 35B, 35C (See FIG. 1); Ground stud connection 35A transformer 30 (See FIGS. 1, 5); Ground stud connection 35B remote head 31A or 32B microphone (See FIGS. 1, 5); Ground stud connection 35C transceiver 31 (See FIGS. 1, 5); Antenna bulkhead connection 36 (See FIGS. 1, 5); Antenna connection cable 36A (See FIG. 1); Line voltage power socket 37 (See FIGS. 1, 5); Mag mount mounting ell bracket 38 (See FIGS. 2, 4, 13-18); Mag mount antenna exterior mount option 38A (See FIG. 2); Data device mounting ell bracket 39 (See FIGS. 2, 4, 13-18); Data device option 39A (See FIG. 2); Data cable option 39B (See FIG. 2); Communication system in a box cover 40 (See FIG. 2); Communication system in a box base 41 (See FIG. 1); Cable management system 42 (See FIG. 2); Transceiver mounting angle bracket 43 (See FIGS. 1, 5, 6-12); Ell bracket 44 1"×1" for mounting transformer 30 (See FIGS. 1, 5, 6-12) and tabletop platform 45 dimension is 7-inch×11 3/16-inch×1/4-inch (See FIGS. 29-30).

Figure 4:
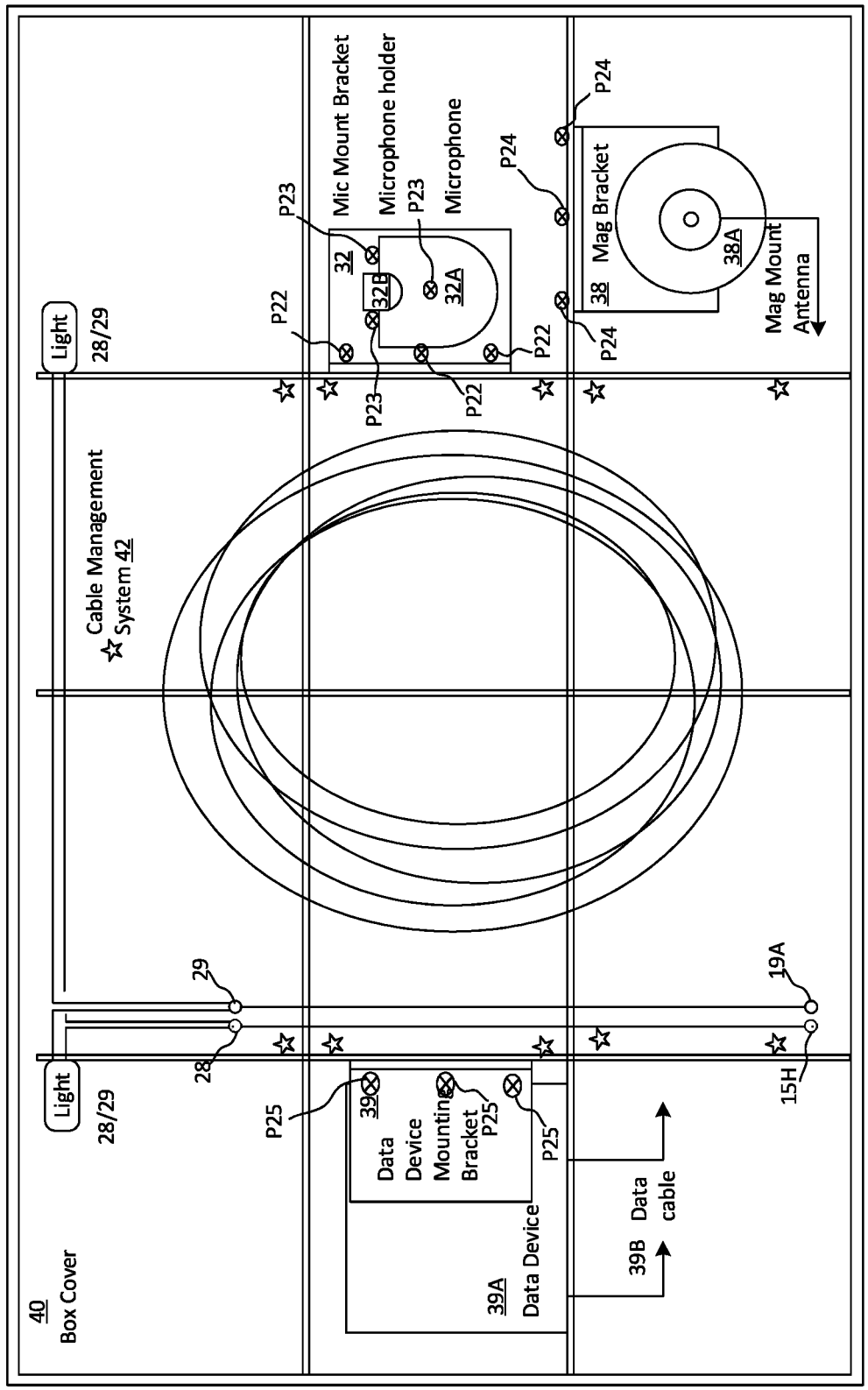
FIG. 4 is a block diagram of the cover of the portable communications system along with cover fastener placement and mounting arrangement, in accordance with some embodiments.

FIG. 4 is a block diagram of the cover of the portable communications system 1000 along with cover fastener placement and mounting arrangement, in accordance with some embodiments. The cover fastener placement and mounting arrangement may include one or more Panhead machine screws (P). Further, the cover fastener placement and mounting arrangement may include one or more of a 6-32 hex nut (N1), 8-32 hex nut (N2), 6-32 wing nut (N3), 8-32 wing nut (N4), #6 flat washer (W1), and #8 flat washer (W2).

Further, the cover fastener placement and mounting arrangement may include Panhead machine screws listed below.

P22=6×32×3/8 inch, 32, 40, W1, N1 bold
P23=6×32×3/8 inch, 32B, 32, W1, N1
P24=6×32×3/8 inch, 38, 40, W1, N1
P25=6×32×3/8 inch, 39B, 40, W1, N1

Figure 5:
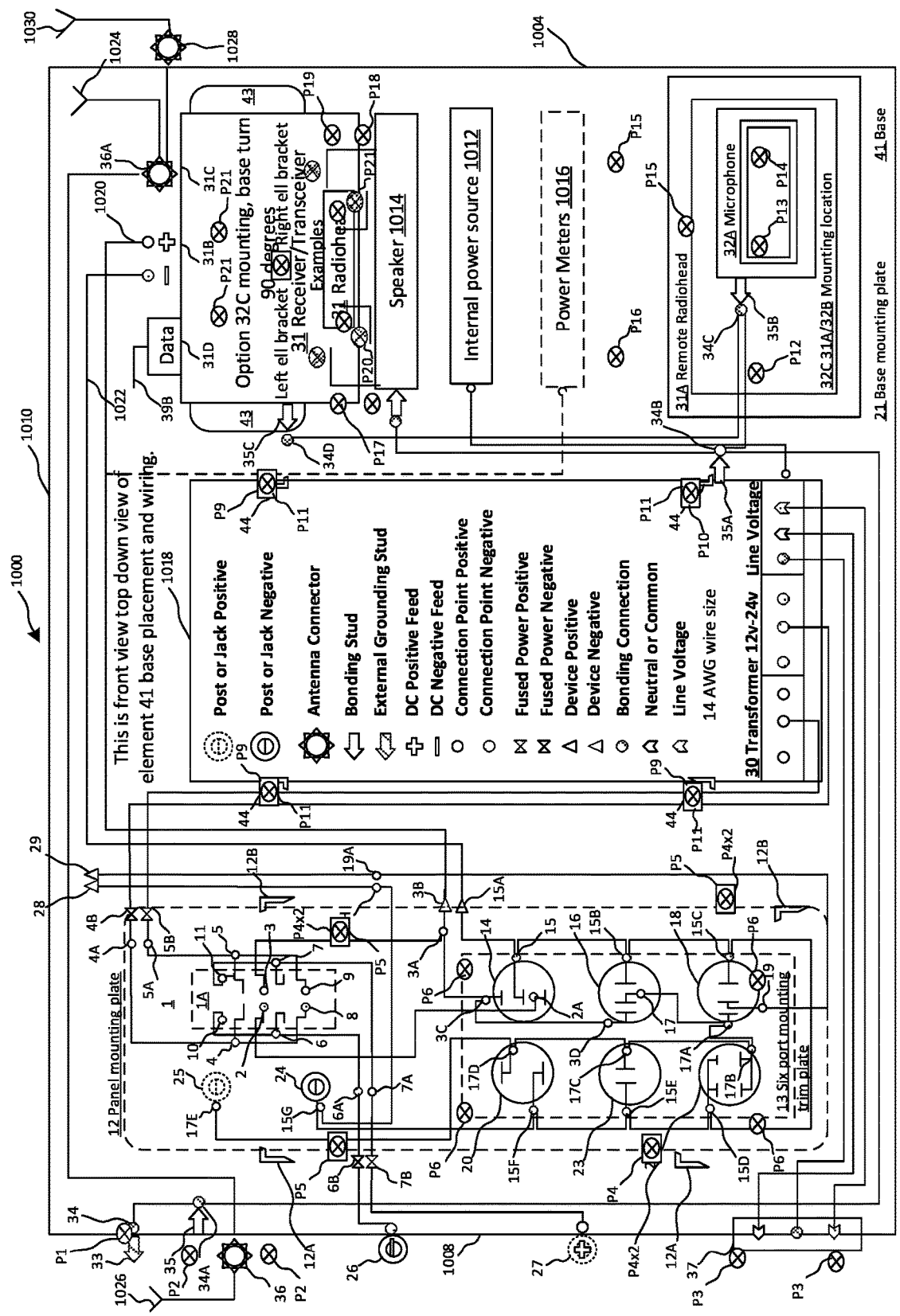
FIG. 5 is a block diagram of a base of a portable communications system along with base fastener placement and mounting arrangement, in accordance with some embodiments.

FIG. 5 is a block diagram of a base of the portable communications system 1000 along with base fastener placement and mounting arrangement, in accordance with some embodiments.

The base fastener placement and mounting arrangement may include panhead machine screws (P), hex nuts, wing nuts, washers listed below.

N1=6-32 hex nut
N2=8-32 hex nut
N3=6-32 wing nut
N4=8-32 wing nut
W1=#6 flat washer
W2=#8 flat washer
P1=8×32×1½ inch. N2, W2, 41, 34, N2, N2, W2, N2
P2=6×32×½ inch, 36, 41, W1, N1
P3=6×32×¾ inch, 41, W1, N1
P4=6×32×½ inch, W1, 41, W1, N1, Face down.
P5=6×32×¾ inch, W1, 41, W1, N1, Face up.
P6=6×32×¾ inch, W1, 41, W1, N1.
P7=6×32×½ inch, W1, 41, W1, N1.
P8=6×32×¾ inch, W1, 13, W1, N1.
P9=8×32×½ inch, W2, 21, 42, 21, 44, W2, N2.
P10=8×32×¾ inch, W2, 21, 44, W2, N2, 34B, N2.
P11=8×32×¼ inch, 44, 30.
P12=6×32×½ inch, W1, W1, 21, W1, N1.
P13=6×32×½ inch, W1, 21, 34C, W1, N1.
P14=6×32×½ inch, W1, 21, 32B, W1, N1.
P15=6×32×¾ inch, W1, 21, 31A, W1, N3.
P16=6×32×¾ inch, W1, 21, 31A, 34D, W1, N3.
P17=6×32×¾ inch, W1, 21, 43, W1, N1, 34D, N1.
P18=6×32×¾ inch, W1, 21, 43, W1, N1.
P19=6×32×¾ inch, W1, 43, 31, W1, N1.
P20=6×32×¾ inch, W2, 21, 31, W2, N2, 34B, N2.
P21=6×32×¾ inch, W2, 21, 44, W2, N2

According to some embodiments, following is a fastener list for FIGS. 4-5.
P=Panhead machine screw
N I=6-32 hex nut
N2=8-32 hex nut
N3=6-32 wing nut
N4=8-32 wing nut
W1=#6 flat washer
W2=#8 flat washer
P1=8×32×1½ inch, N2, W2, 34, N2, N2, W2, N2
P2=6×32×½ inch, 41, W1, N1.
P3=6×32×¾ inch, 41, W1, N1.
P4=6×32×½ inch, W1, 41, W1, N1.
P5=6×32×¾ inch, W1, 41, W1, N1. Face up.
P6=6×32×¾ inch, W1, 41, W1, N1. Face down.
P7=6×32×½ inch, W1, 41, W1, N1.
P8=6×32×¾ inch, W1, 13, W1, N1.
P9=8×32×½-inch, W2, 21, 42, 21, 44, W2, N2.
P10=8×32×¾-inch, 4, W2, N2, 34B, N2.
P11=8×32×¼-inch, 44, 30.
P12=6×32×½ inch, W1, W1, 21, W1, N1
P13=6×32×½ inch, W1, 21, W1, 34C, W1, N1.
P14=6×32×½ inch, W1, 21, 32B, W1, N1.
P15=6×32×¾ inch, W1, 21, 31A, W1, N3.
P16=6×32×¾ inch, W1, 21, 31A, 34D, W1, N3.
P17=6×32×¾n ch, W1, 21, 43, W1, N1, 34D, N1.
P18=6×32×¾-inch, W1, 21, 43, W1, N1
P19=6×32×¾-inch, W1, 43, 31, W1, N1
P20=8×32×¾-inch, W2, 21, 31, W2, N2, 34B, N2
P21=8×32×¾-inch, W2, 21, 44, W2, N2

According to some embodiments, following is an Ell bracket list for FIGS. 4-5.
Element 12A ell bracket ¾×1½×½-inch
Element 12B ell bracket ¾×1½×½-inch
Element 32 ell bracket mounting plate ½×2×2¾-inch
Element 38 ell bracket mounting plate ½×2×2¾-inch
Element 39 ell bracket mounting plate ½×2×2¾-inch
Element 43 angle bracket mounting plate 3½×3½×5¾-inch
Element 44 ell brackets 1×1×½-inch.

The portable communications system 1000 may include one or more items including black 3-inch (quantity 4, unit A), black 4-inch (quantity 5, unit A), black 8-inch (quantity 7, unit A), black 36-inch (quantity 1, unit A), red 3-inch (quantity 4, unit A), red 4-inch (quantity 5, unit A), red 8-inch (quantity 8, unit A), red 36-inch (quantity 1, unit A), ground 4-inch (quantity 2, unit A), ground 8-inch (quantity 1, unit A), ground 22-inch (quantity 1, unit A), Anderson powerpole set {sold as pair} (quantity 2, unit B), #12 male disconnect tab 0.25 [MTI10250Q] (quantity 2, unit B), #12 female disconnect tab 0.25 (quantity 15, unit B), #12 ring terminal ¼ stud (quantity 2, unit B), #12 butt connector [MN10BCXA] (quantity 1, unit B), #14 male disconnect tab 0.25 [MTI14250Q] (quantity 25, unit B), #14 female disconnect tab 0.25 (quantity 6, unit B), #14 ring terminal ¼ stud (quantity 2, unit B), #14 ring terminal 8 stud [MNG148RLX] (quantity 5, unit B), #14 fork terminal 8 stud [MNG148FX] (quantity 5, unit B), #18 male disconnect tab 0.25 (quantity 2, unit B), #18 female disconnect tab 0.25 (quantity 2, unit B), tee connector female 12V 2 Pin (quantity 1, unit C), coax connector vhf/uhf female to female panel mount [SO239] (quantity 1, unit C), binding post red/black [Uxcell M6] (quantity 4, unit C), 120V power switch (quantity 4, unit C), mail power socket 10a 250v inlet module plug, 5a fuse switch (unit C).

Further, the portable communications system 1000 may include one or more items including #6-32¼-inch [JPMP78], #6-32⅜-inch [JRM17] (quantity box/cover 17), #6-32½-inch [JRM80] (quantity baseplate 2, quantity box/cover 19), #6-32¾-inch [JRM81] (quantity baseplate 3, quantity box/cover 3), #6-32 1-inch [JRM81], #6-32 nut {Hexagon} [JN159] (quantity baseplate 9, quantity box/cover 36), #6-32 washer {SAE Flat} [JSW70] (quantity baseplate 18, quantity box/cover 31), #6-32 wing nut [JWNCF2] (quantity baseplate 3, quantity box/cover 3), #8-32¼-inch [JPMP4] (quantity baseplate 4), #8-32⅜-inch [JRM18], #8-32½-inch [JRM84] (quantity baseplate 3), #8-32⅜-inch [JRM18], #8-32¾-inch [JRM85] (quantity baseplate 5), #8-32 1-inch [JRM86], #8-32 1.5-inch [JRM88] (quantity baseplate 1), #8-32 nut {Hexagon} [JN160] (quantity baseplate 13), #8-32 washer {SAE Flat} [JSW71] (quantity baseplate 20), #8-32 wing nut [JWNCF3] (quantity baseplate 1), #M6×45.1 {mach scr PH zinc} (quantity baseplate 2), #M6×1 nut (quantity baseplate 4), ELL bracket 1-inch (quantity box/cover 4), ELL bracket 1.5×0.1.5" (custom cut to 1.5×0.75) (quantity box/cover 4), brief case 14×22×6.5" (quantity box/cover 1), control panel mount #1, rocker switch DPDT illuminated On/Off/On [Gama Electronics] (quantity box/cover 1), rocker switch holder [MicTuning MH001]] (quantity box/cover 1), 6-port mounting plate (quantity box/cover 1), mutli meter volts, amps [cllena] (quantity box/cover 1), USB charging port 5V 2.1A input 12V-24V DC (quantity box/cover 1), rocker switch w/housing, illuminated (R,G,B) 12v-24V DC [cllena] (quantity box/cover 2), power socket input 12V 20A DC (quantity box/cover 1), powerpole, panel mount two powerpole connectors (quantity box/cover 1), binding post set M6×1 12V 20A [uxcell] (quantity box/cover 1), LED 12V light {set} [Amazenar] (quantity box/cover 2), 120V power cable 18-inch total, 14-inch switch to converter, 4-inch jumpers for switch, fuse holder 20a 10-inch [huicao] (quantity box/cover 4), base mounting plate #2 (quantity box/cover 1), 120V inlet modular plug 10A 240V w/Switch (quantity box/cover 1), power supply AC to DC 12V 30A Input 100–240V [eTopxizu] (quantity box/cover 1), angle mounting plate for choosing radio (quantity box/cover 1), mini bungee cord 10″ w/St1 hooks (quantity box/cover 4), microphone holder clip (quantity box/cover 2), microphone holder plate (quantity box/cover 1), antenna mounting plate (quantity box/cover 1), Signal link sound card holder (quantity box/cover 1), P1259 connectors w/reducer RG59 (quantity box/cover 2), RG59 Coax 24-inches (quantity box/cover 1), Further, the portable communications system 1000 may include one or more add ons, purchase separately including TM710GA radio, TM281 radio, signal link USB sound card (quantity box/cover 1), tram antenna 2 meter ¼ wave mag mount 12-Ft [Tram 1185] (quantity box/cover 1), USB to serial (DB-9) adapter (quantity box/cover 1), powerpole adapter kit (quantity box/cover 1), USB plug in charger (quantity box/cover 1), CAT5 extension 18-inch (quantity box/cover 1), powerpole to socket, powerpole to ring, powerpole to clamps, powerpole extension.

Figure 6:
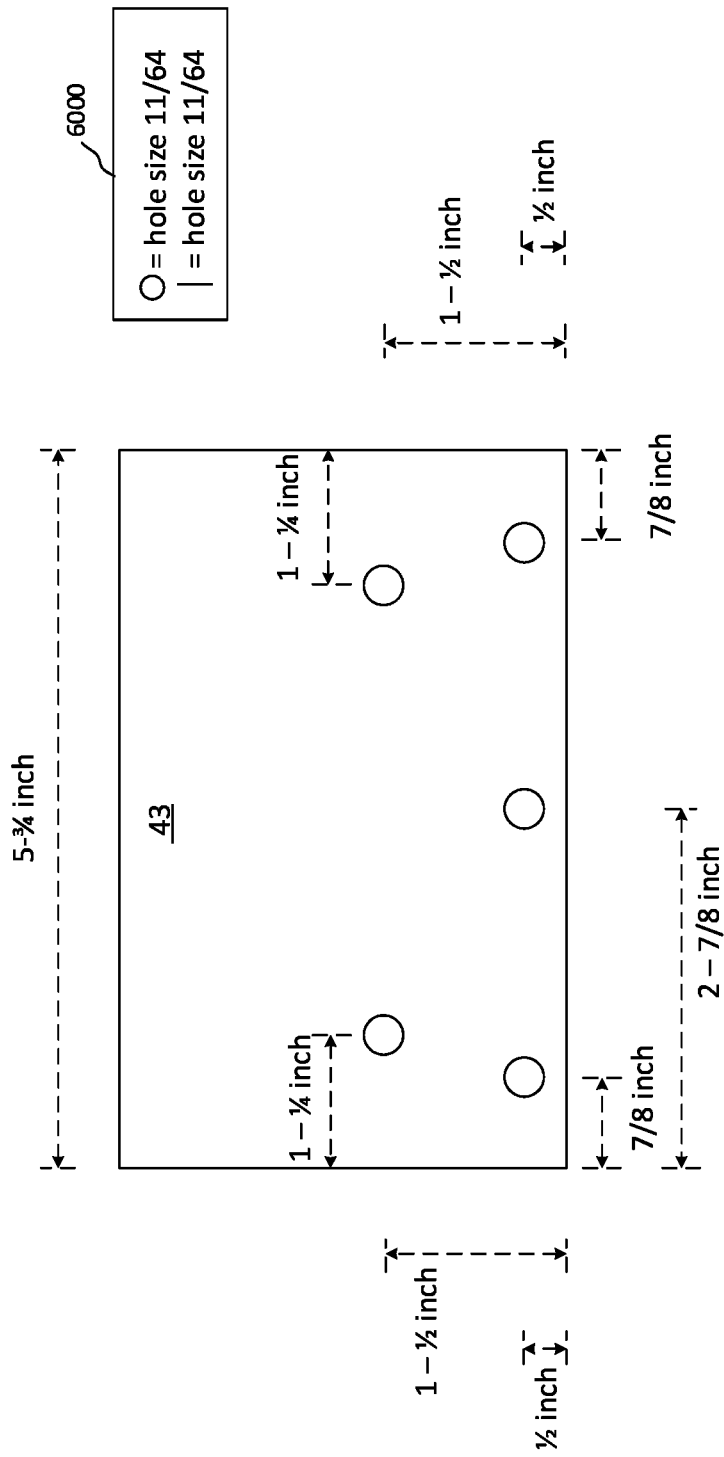
FIG. 6 is a top view of a mounting bracket in accordance with some embodiments.

FIG. 6 is a top view of a mounting bracket 43 in accordance with some embodiments. The figure also shows dimensions of various parts of the mounting bracket 43. A legend 6000 is shown in FIG. 6.

Figure 7:
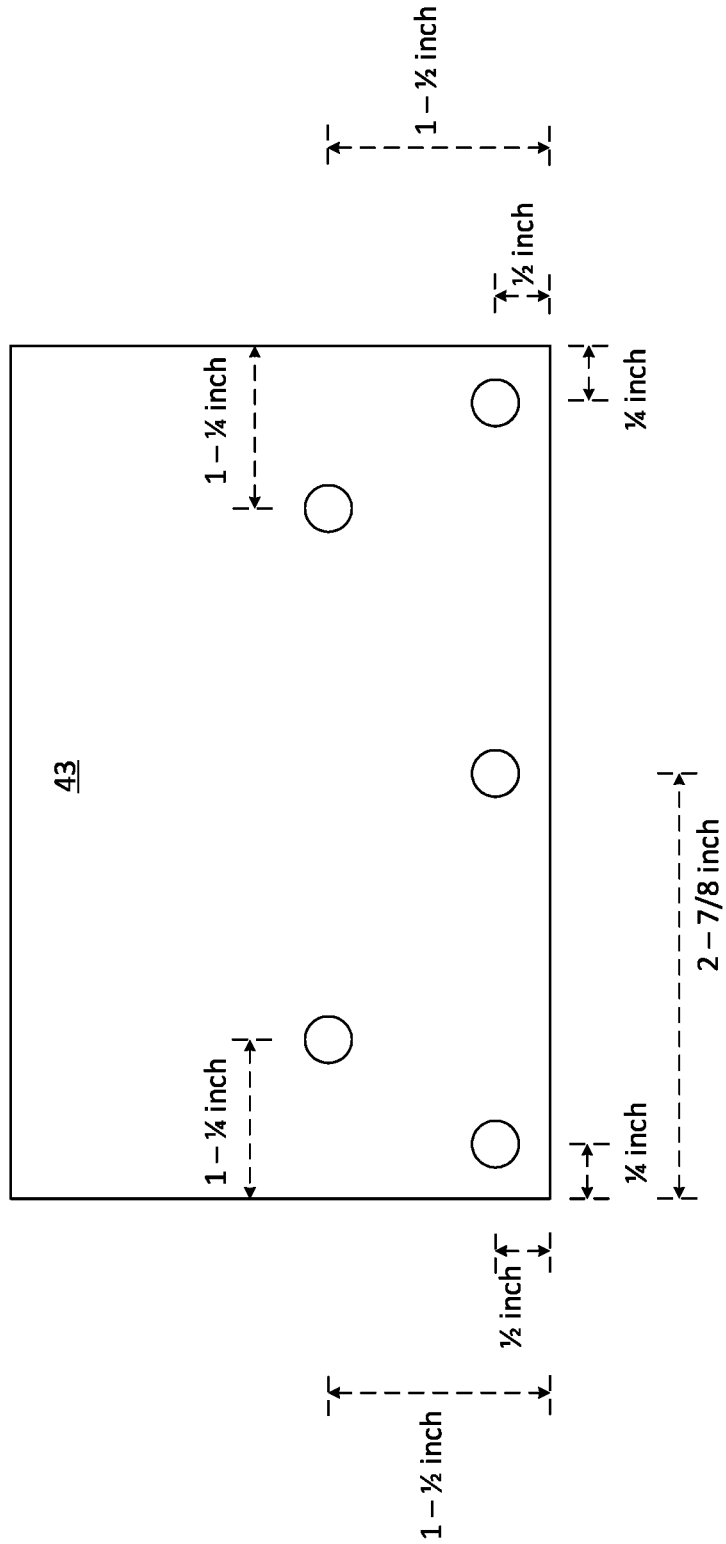
FIG. 7 is a bottom view of the mounting bracket in accordance with some embodiments.

FIG. 7 is a bottom view of the mounting bracket 43 in accordance with some embodiments.

Figure 8:
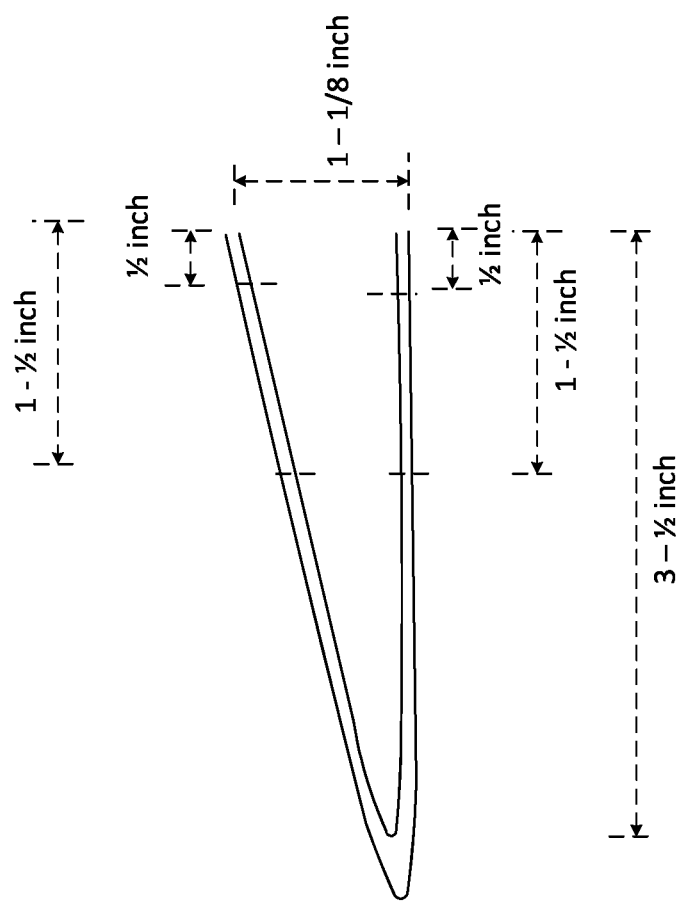
FIG. 8 is a side view of the mounting bracket in accordance with some embodiments.

FIG. 8 is a side view of the mounting bracket 43 in accordance with some embodiments.

Figure 9:
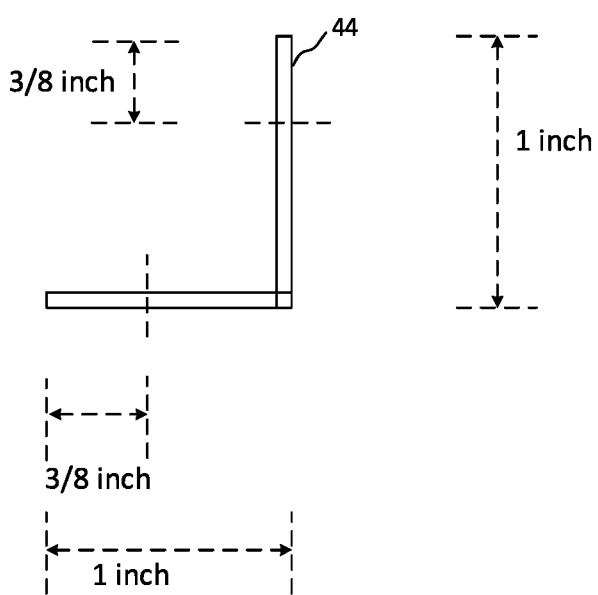
FIG. 9 is a top view of a left ell bracket in accordance with some embodiments.

FIG. 9 is a top view of a left ell bracket 44 in accordance with some embodiments. The left ell bracket 44 may have ¹⁄₁₆-inch thickness.

Figure 10:
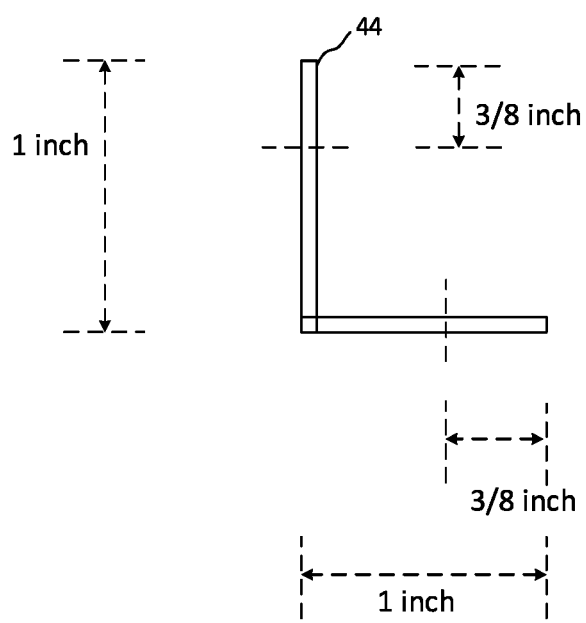
FIG. 10 is a top view of a right ell bracket in accordance with some embodiments.

FIG. 10 is a top view of a right ell bracket 44 in accordance with some embodiments. The right ell bracket 44 may have ¹⁄₁₆-inch thickness.

Figure 11:
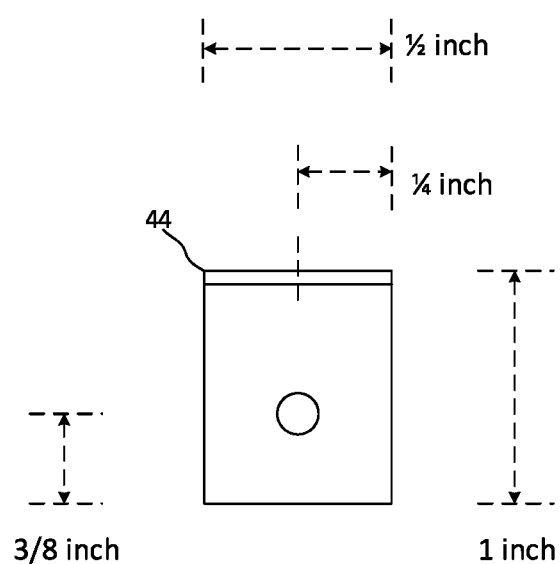
FIG. 11 is a side view of a left ell bracket in accordance with some embodiments.

FIG. 11 is a side view of the left ell bracket 44 in accordance with some embodiments.

Figure 12:
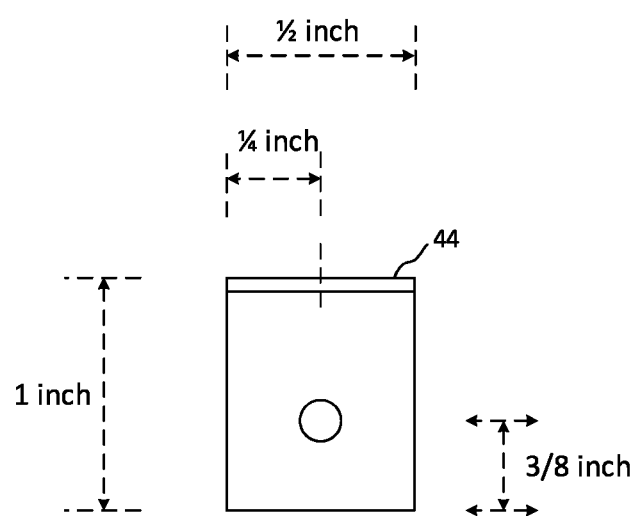
FIG. 12 is a side view of a right ell bracket in accordance with some embodiments.

FIG. 12 is a side view of the right ell bracket 44 in accordance with some embodiments.

Figure 13:
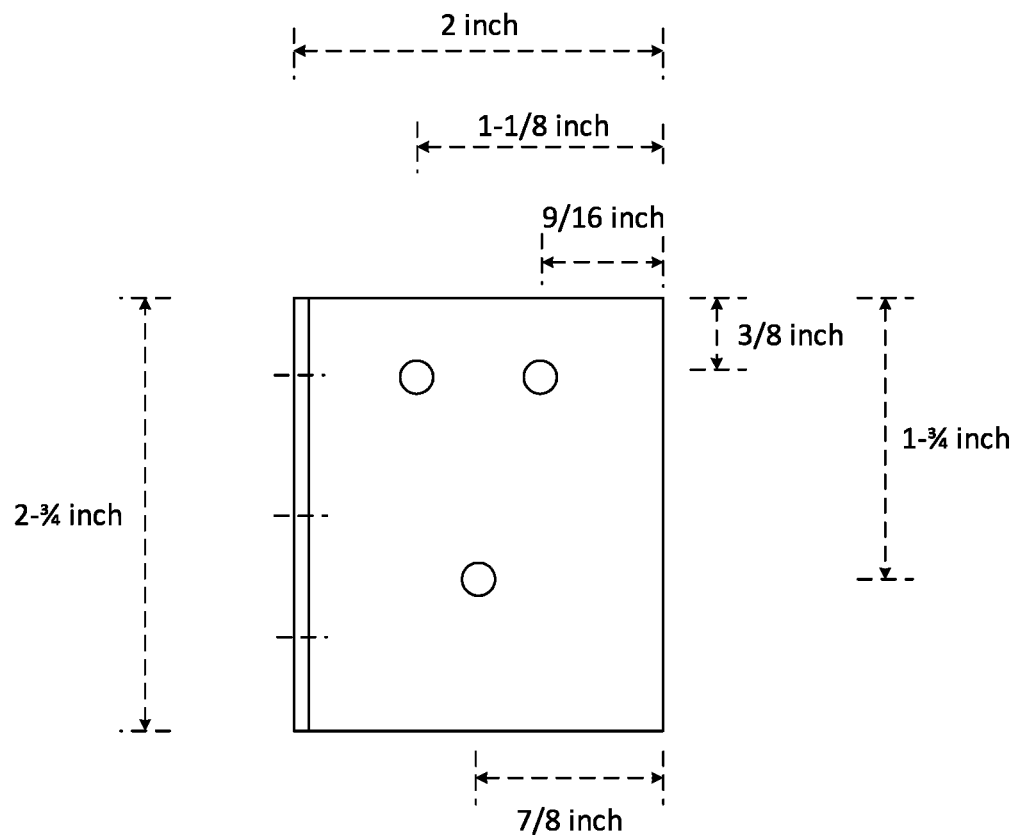
FIG. 13 is a top view of a mounting bracket in accordance with some embodiments.

FIG. 13 is a top view of a mounting bracket 32 in accordance with some embodiments. Further, the mounting bracket 38 may have same dimensions and shaper as the mounting bracket 32. A legend 13000 is shown in FIG. 13.

Figure 14:
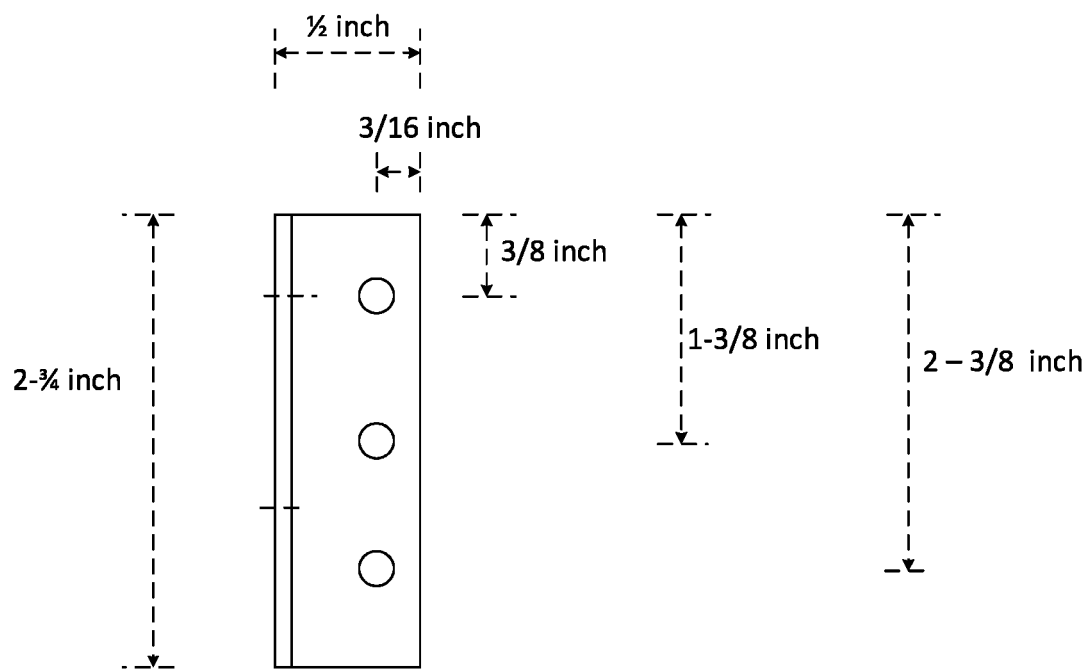
FIG. 14 is a front view of the mounting bracket in accordance with some embodiments.

FIG. 14 is a front view of the mounting bracket 32 in accordance with some embodiments.

Figure 15:
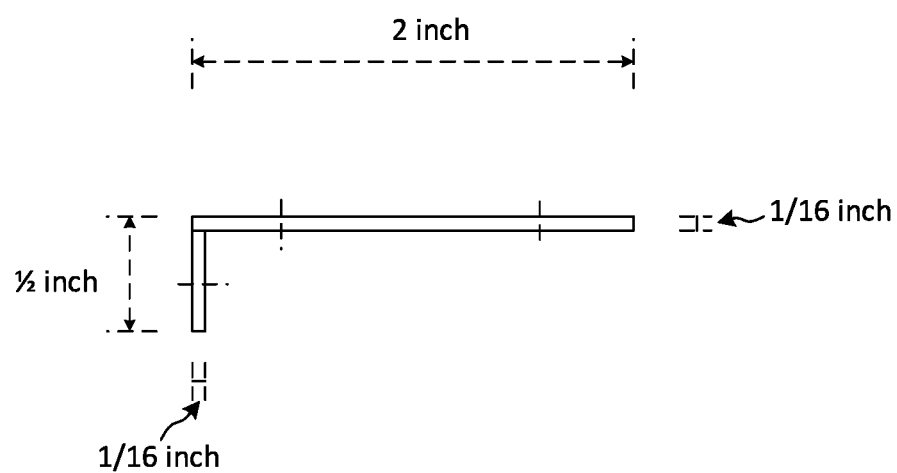
FIG. 15 is a side view of the mounting bracket in accordance with some embodiments.

FIG. 15 is a side view of the mounting bracket 32 in accordance with some embodiments.

Figure 16:
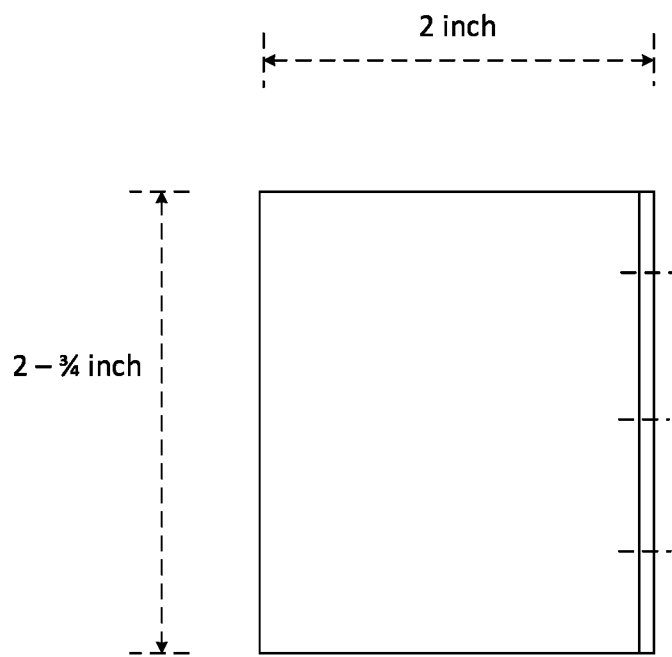
FIG. 16 is a top view of a mounting bracket in accordance with some embodiments.

FIG. 16 is a top view of a mounting bracket 39 in accordance with some embodiments.

Figure 17:
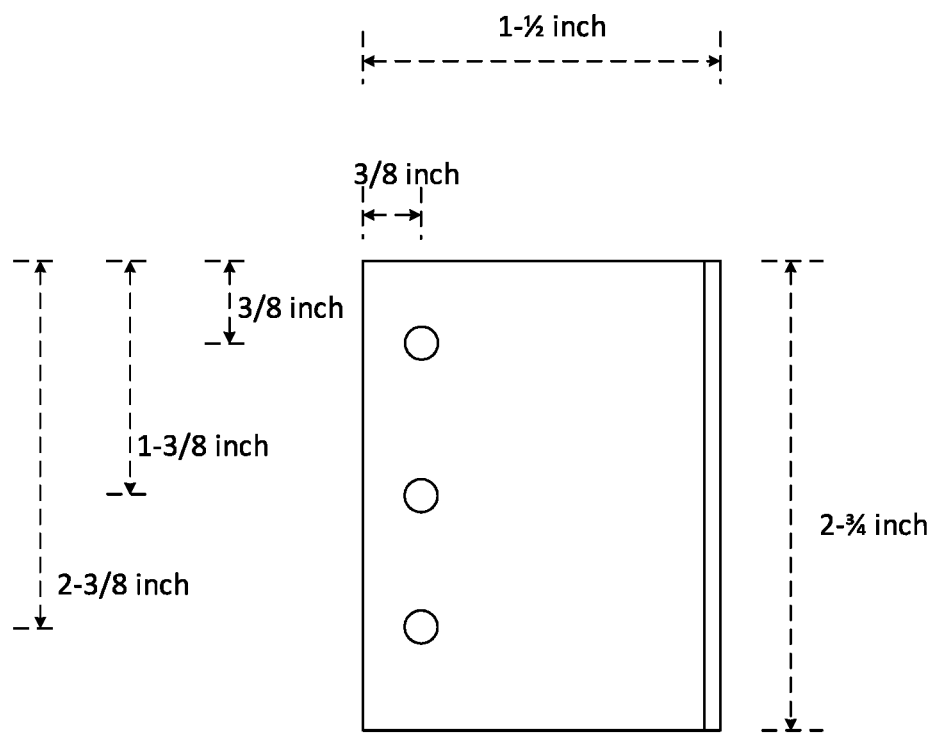
FIG. 17 is a front view of the mounting bracket in accordance with some embodiments.

FIG. 17 is a front view of the mounting bracket 39 in accordance with some embodiments. A legend 17000 is shown in FIG. 17.

Figure 18:
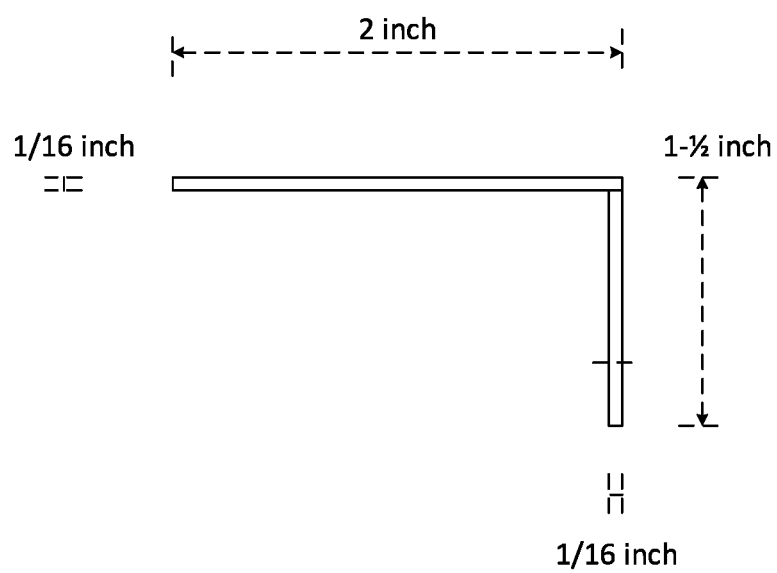
FIG. 18 is a side view of the mounting bracket in accordance with some embodiments.

FIG. 18 is a side view of the mounting bracket 39 in accordance with some embodiments.

Figure 19:
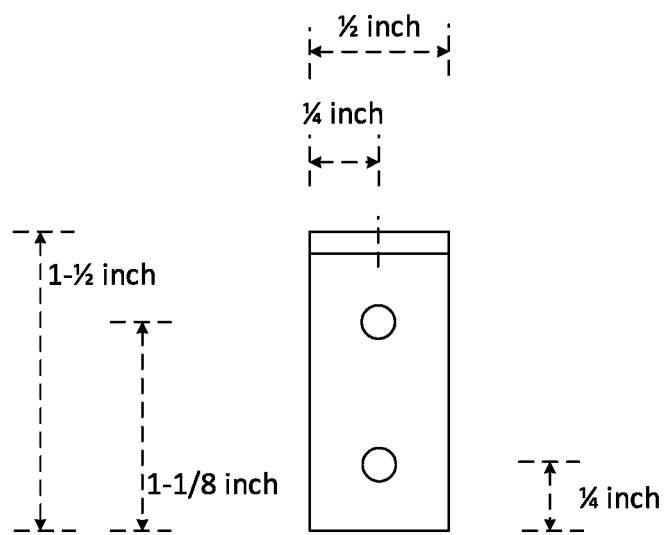
FIG. 19 is a top view of a left ell bracket in accordance with some embodiments.

FIG. 19 is a top view of a left ell bracket 12A in accordance with some embodiments. A legend 19000 is shown in FIG. 19.

Figure 20:
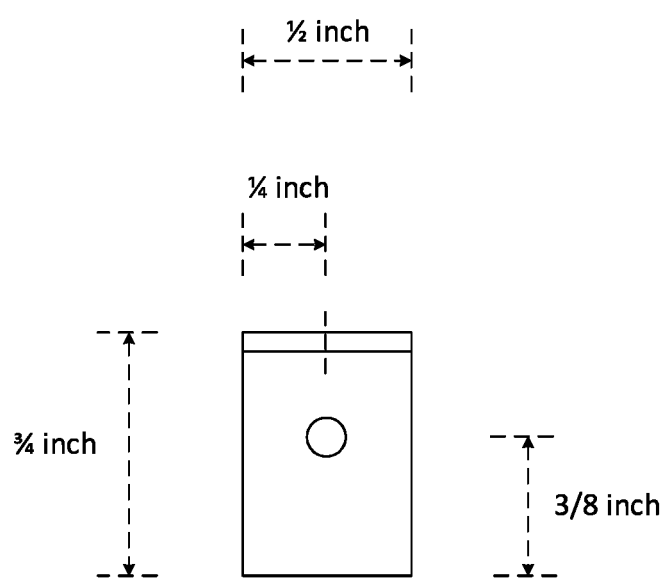
FIG. 20 is a front view of the left ell bracket in accordance with some embodiments.

FIG. 20 is a front view of the left ell bracket 12A in accordance with some embodiments.

Figure 21:
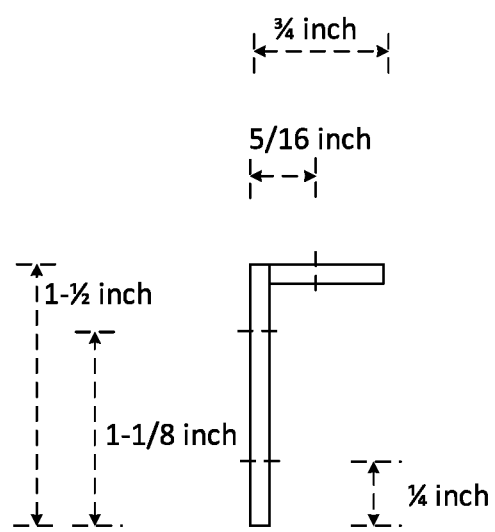
FIG. 21 is a side view of the left ell bracket in accordance with some embodiments.

FIG. 21 is a side view of the left ell bracket 12A in accordance with some embodiments.

Figure 22:
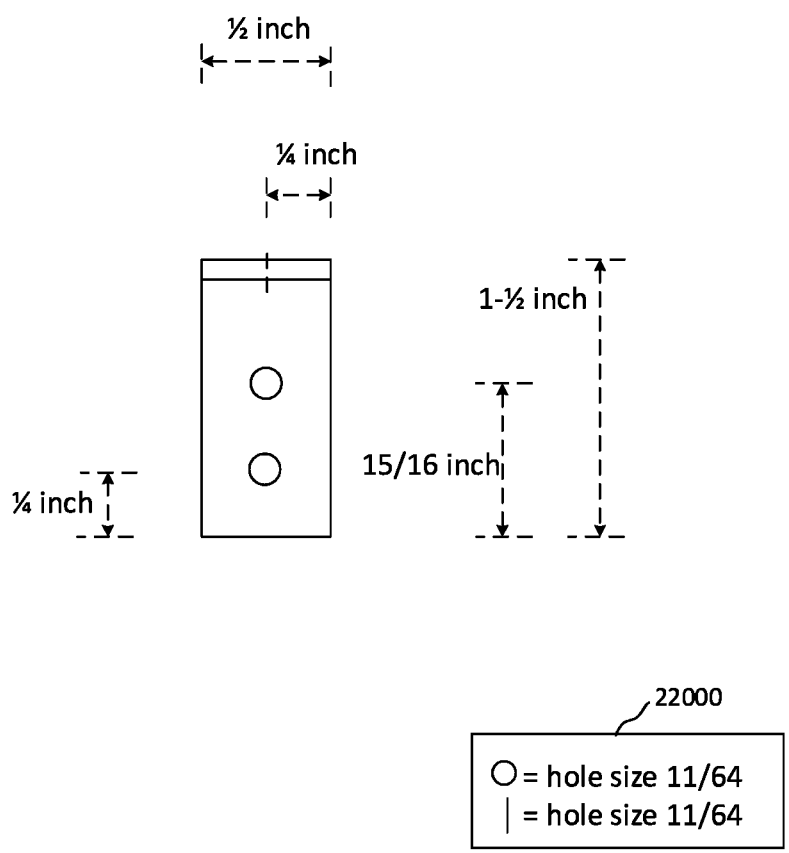
FIG. 22 is a top view of a right ell bracket in accordance with some embodiments.

FIG. 22 is a top view of a right ell bracket 12B in accordance with some embodiments. A legend 22000 is shown in FIG. 22.

Figure 23:
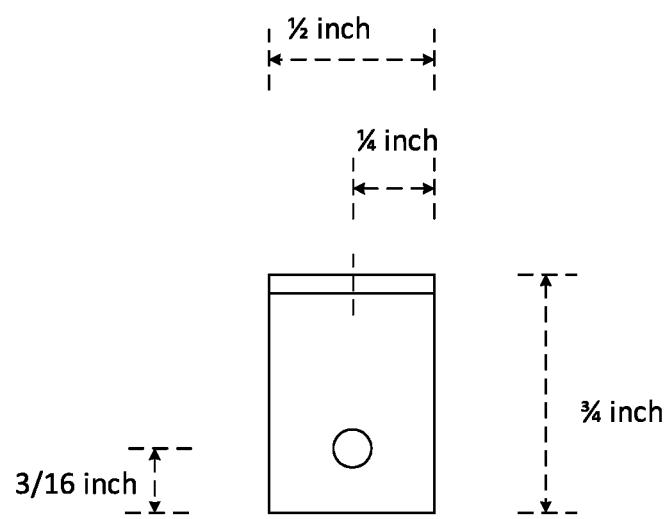
FIG. 23 is a front view of the right ell bracket in accordance with some embodiments.

FIG. 23 is a front view of the right ell bracket 12B in accordance with some embodiments.

Figure 24:
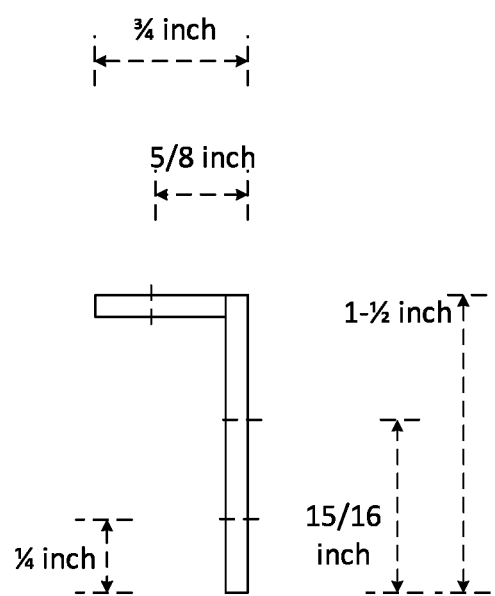
FIG. 24 is a side view of the right ell bracket in accordance with some embodiments.

FIG. 24 is a side view of the right ell bracket 12B in accordance with some embodiments.

Figure 25:
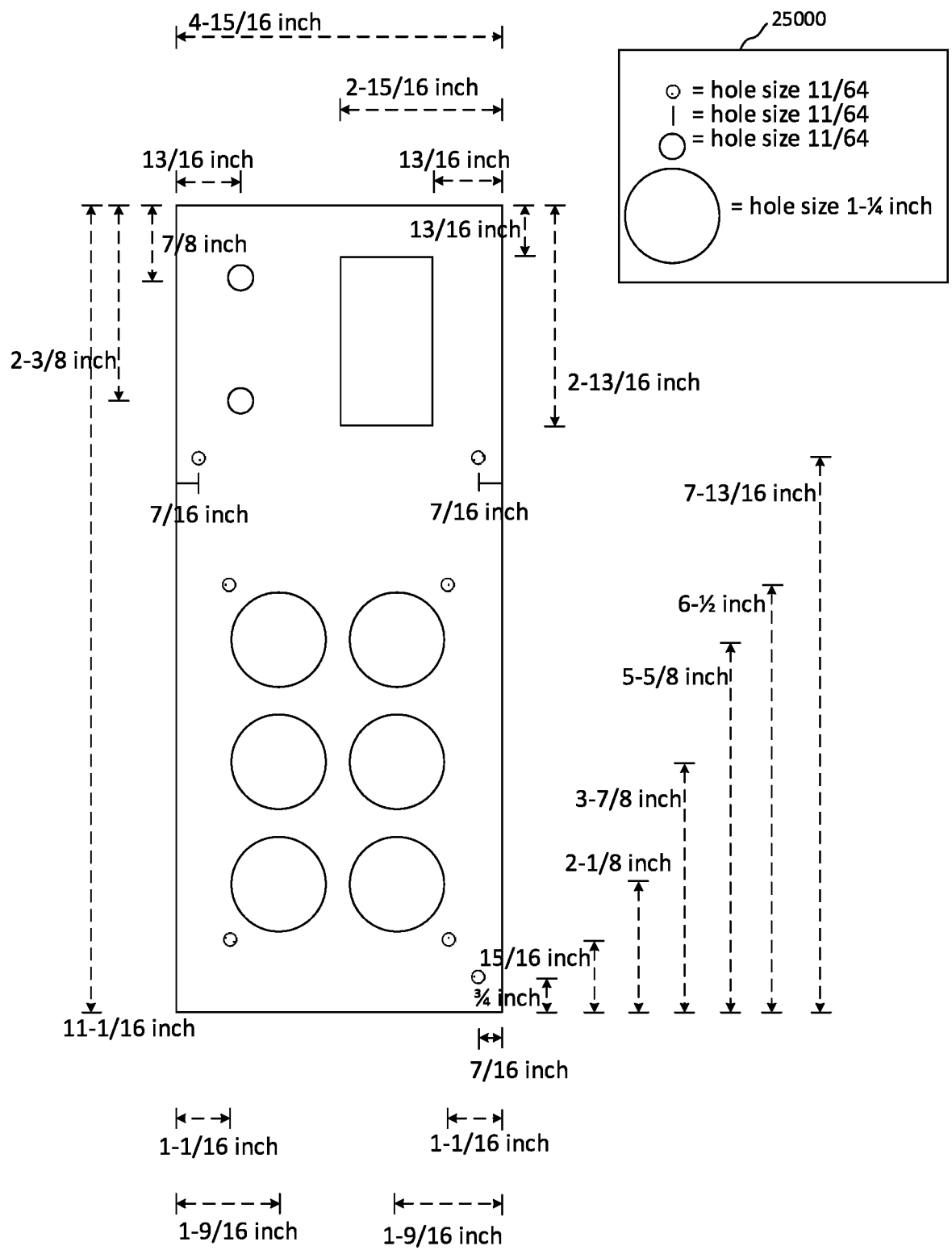
FIG. 25 is a top view of a panel mounting plate in accordance with some embodiments.

FIG. 25 is a top view of a panel mounting plate 12 in accordance with some embodiments. A legend 25000 is shown in FIG. 25.

Figure 26:
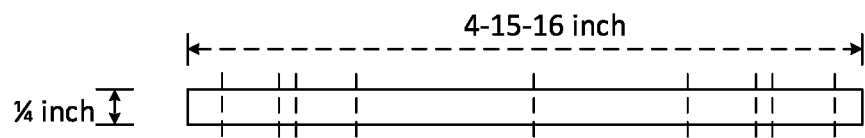
FIG. 26 is a side view of the panel mounting plate in accordance with some embodiments.

FIG. 26 is a side view of the panel mounting plate 12 in accordance with some embodiments.

Figure 27:
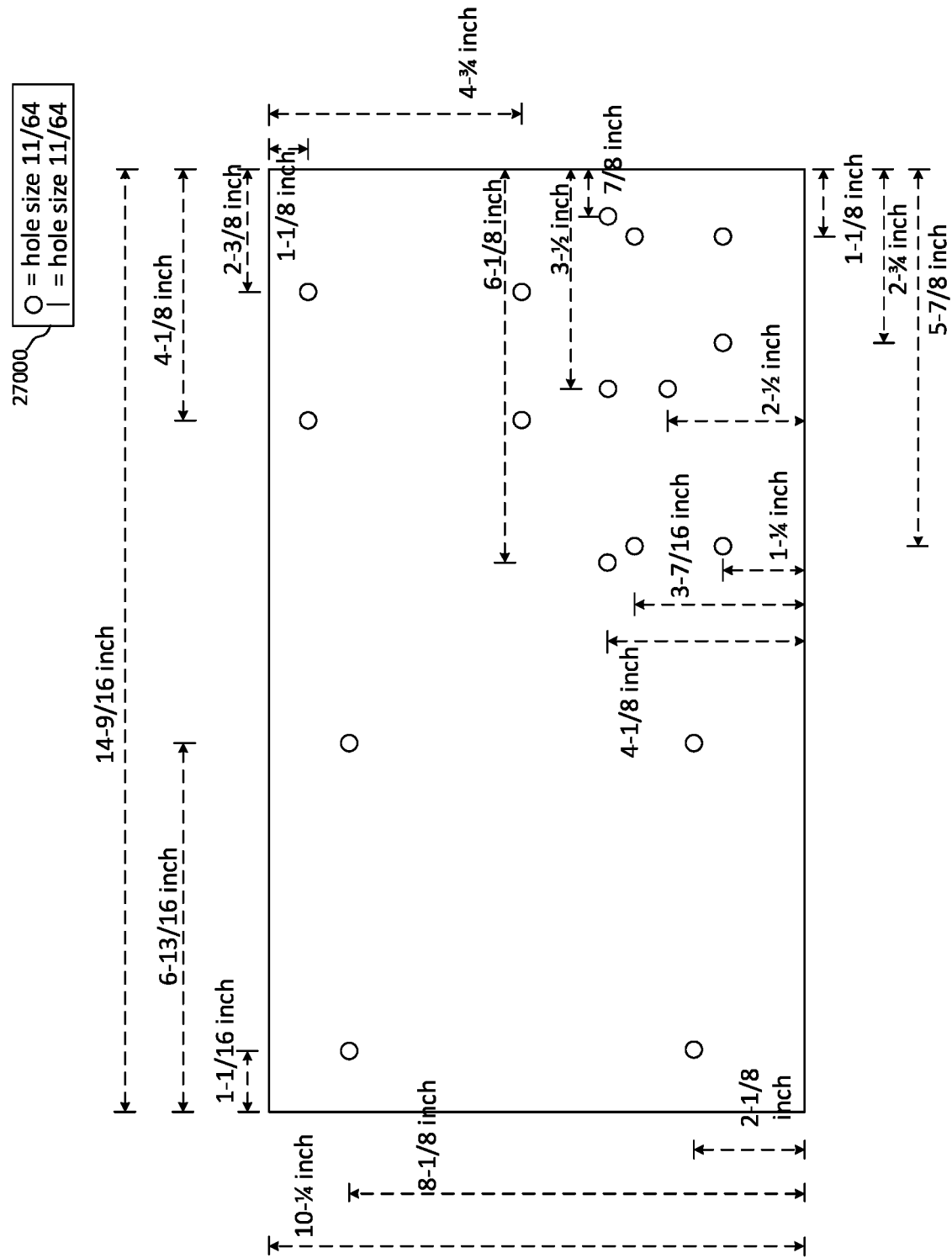
FIG. 27 is a top view of a base mounting plate in accordance with some embodiments.

FIG. 27 is a top view of a base mounting plate 21 in accordance with some embodiments. A legend 27000 is shown in FIG. 27.

Figure 28:
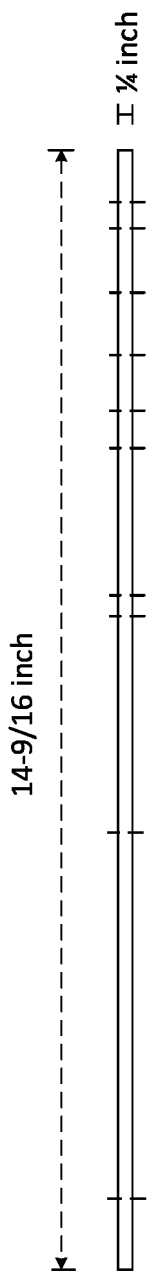
FIG. 28 is a side view of the base mounting plate in accordance with some embodiments.

FIG. 28 is a side view of the base mounting plate 21 in accordance with some embodiments.

Figure 29:
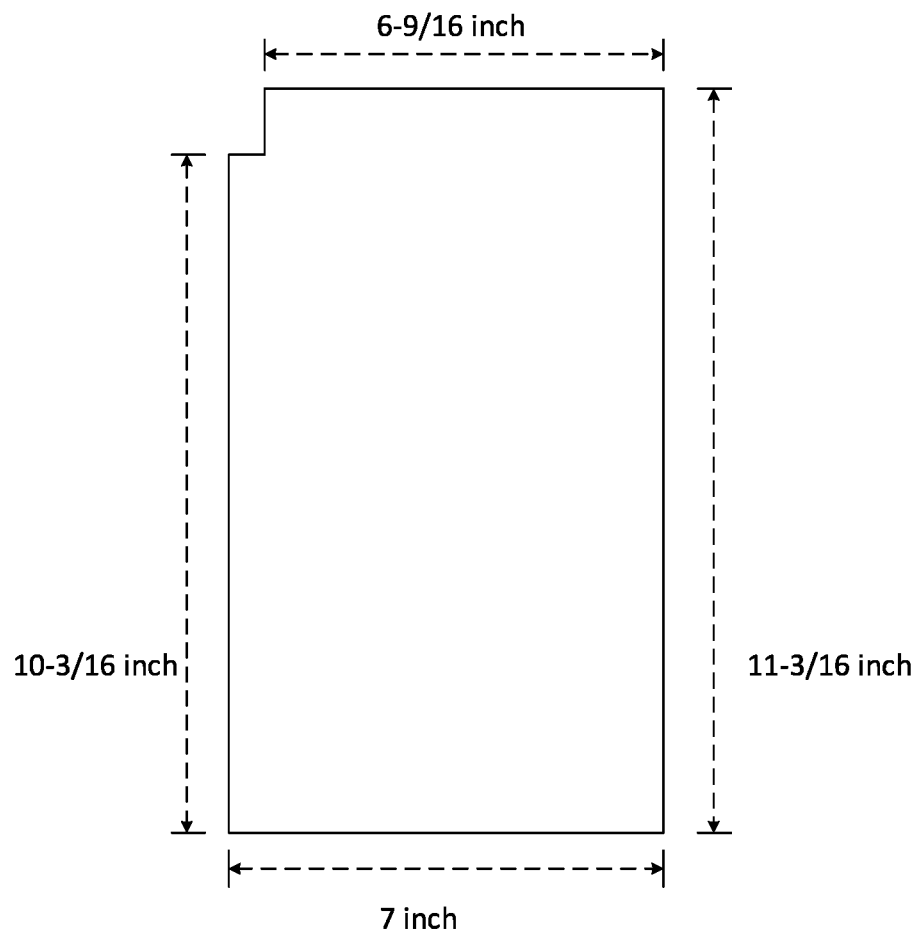
FIG. 29 is a top view of a tabletop platform in accordance with some embodiments.

FIG. 29 is a top view of a tabletop platform 45 in accordance with some embodiments.

Figure 30:
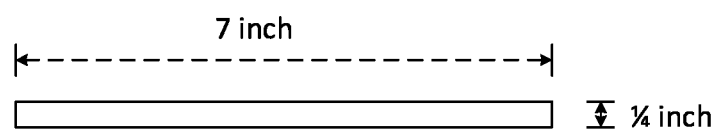
FIG. 30 is a side view of the tabletop platform in accordance with some embodiments.

FIG. 30 is a side view of the tabletop platform 45 in accordance with some embodiments.

According to some embodiments, a portable communications system 1000 is disclosed. The portable communications system 1000 may include an enclosure 1002 configured to house a plurality of components (such as power sources, transceivers, receivers, antenna, sound cards, data devices, cables and devices). Further, the enclosure 1002 may include a plurality of sidewalls 1004-1010 forming an interior space. Further, the plurality of sidewalls 1004-1010 may be water resistant and impact resistant.

Further, the portable communications system 1000 may include at least one frame (such as frames 12A, 12B, 44) attached to at least one inner surface of the plurality of sidewalls 1004-1010.

Further, the portable communications system 1000 may include at least one mounting plate (such as mounting plates 12, 21) attached to the at least one frame (such as frames 12A, 12B, 44). Further, the at least one mounting plate (such as the mounting plates 12, 21) may be configured to mount the plurality of components.

In some embodiments, the enclosure 1002 may include a box comprising a base 41 and a cover 40. Further, the at least one frame (such as frames 12A, 12B, 44) may include a base frame attached to the base and a cover frame attached to the cover. Further, the at least one mounting plate (such as the mounting plates 12, 21) may include a base mounting plate attached to the base frame and a cover mounting plate attached to the cover frame.

Further, the portable communications system 1000 may include a plurality of component holders (such as, component holders 32B and 39) attached to the at least one mounting plate (such as the mounting plates 12, 21). Further, the plurality of component holders (such as, the component holders 32B and 39) may be configured to detachably attach with the plurality of components. Further, the plurality of component holders (such as, the component holders 32B and 39) may include a plurality of electrical terminals.

Further, the portable communications system 1000 may include at least one wiring arrangement (such as wiring arrangements 28 and 29) electrically coupled to the plurality of component holders (such as, the component holders 32B and 39). Further, the at least one wiring arrangement (such as the wiring arrangements 28 and 29) may form an electrical connection between at least one first electrical terminal of a first component holder and at least one second electrical terminal of a second component holder.

Further, the portable communications system 1000 may include a plurality of external antenna connections (such as the antenna connections 36 and 1028) configured to mount a plurality of external antenna (such as antenna 1026 and 1030). Further, the plurality of external antenna connections (such as the antenna connections 36 and 1028) may be disposed over at least one sidewall of the plurality of sidewalls 1004-1010. Further, the plurality of external antenna connections (such as the antenna connections 36 and 1028) may be electrically coupled to the at least one wiring arrangement (such as the wiring arrangements 28 and 29).

Further, the portable communications system 1000 may include an internal power source 1012 configured to provide electrical energy to at least one component of the plurality of components. Further, the internal power source 1012 may be attached to the at least one frame (such as frames 12A, 12B, 44).

Further, the portable communications system 1000 may include at least one input power connector (such as an input power connector 37) configured to connect with a plurality of external power sources. Further, the at least one input power connector (such the input power connector 37) may be electrically coupled to the at least one wiring arrangement (such as the wiring arrangements 28 and 29). Further, the at least one input power connector (such as the input power connector 37) may be disposed over at least one sidewall of the plurality of sidewalls 1004-1010.

Further, the portable communications system 1000 may include a plurality of output power connectors (such as output power connectors 26-27) configured to connect with a plurality of external electrical loads. Further, the plurality of output power connectors (such as output power connectors 26-27) may be electrically coupled to the at least one wiring arrangement (such as the wiring arrangements 28 and 29). Further, the plurality of output power connectors (such as output power connectors 26-27) may be disposed over at least one sidewall of the plurality of sidewalls 1004-1010.

Further, the portable communications system 1000 may include a power selector switch 1 electrically coupled with each of the at least one input power connector (such as the input power connector 37), the plurality of output power connectors (such as output power connectors 26-27), the internal power source 1012 and an internal power distribution network 1020-1022. Further, the power selector switch 1 may be configured to selectively connect at least one of the at least one input power connector (such as the input power connector 37) and the internal power source 1012 with at least one of the plurality of output power connectors (such as output power connectors 26-27) and the internal power distribution network 1020-1022. Further, the at least one wiring arrangement (such as the wiring arrangements 28 and 29) may include the power distribution network.

Further, the portable communications system 1000 may include at least one power converter (such as a transformer 30) configured to convert electrical power from a first voltage level to a second voltage level. Further, the at least one power converter (such as the transformer 30) may be electrically coupled to the at least one input power connector (such as the input power connector 37) and the internal power distribution network 1020-1022.

Further, the portable communications system 1000 may include a plurality of power meters 1016 configured to measure a plurality of power consumptions corresponding to the plurality of components. Further, the plurality of power meters 1016 may be configured to present a plurality of indications corresponding to the plurality of power consumptions. Further, the plurality of power meters 1016 may be electrically coupled to the internal power distribution network 1020-1022.

Further, the portable communications system 1000 may include a plurality of antenna 1024-1026 configured to intercept radio waves corresponding to a plurality of frequency bands. Further, the plurality of antenna 1024-1026 may be configured to be detachably attached to the plurality of component holders (such as, the component holders 32B and 39).

Further, the portable communications system 1000 may include a plurality of receivers 31 and 1032 communicatively coupled to the plurality of antenna 1024-1026 through the at least one wiring arrangement (such as the wiring arrangements 28 and 29).

Further, the plurality of receivers 31 and 1032 may be configured to receive signals based on the interception of the radio waves. Further, the plurality of receivers 31 and 1032 may be configured to be detachably attached to the plurality of component holders (such as, the component holders 32B and 39).

Further, the portable communications system 1000 may include a plurality of transmitters 31 and 1032 communicatively coupled to the plurality of antenna 1024-1026 through the at least one wiring arrangement (such as the wiring arrangements 28 and 29). Further, the plurality of transmitters 31 and 1032 may be configured to transmit signals over the plurality of frequency bands through the plurality of antenna 1024-1026. Further, the plurality of transmitters may be configured to be detachably attached to the plurality of component holders (such as, the component holders 32B and 39).

Further, the portable communications system 1000 may include at least one input device (such as a microphone 32A) configured to receive input from a user. Further, the at least one input device (such as the microphone 32A) may be configured to be detachably attached to the plurality of component holders (such as, the component holders 32B and 39). Further, the at least one input device (such as the microphone 32A) may be communicatively coupled to the plurality of transmitters 31 and 1032 through the at least one wiring arrangement (such as the wiring arrangements 28 and 29).

Further, the portable communications system 1000 may include at least one output device (such as a speaker 1014, and LED lighting elements 28-29) configured to present output to the user. Further, the at least one output device (such as the speaker 1014, and the LED lighting elements 28-29) may be configured to be detachably attached to the plurality of component holders (such as, the component holders 32B and 39). Further, the at least one output device (such as the speaker 1014, and the LED lighting elements 28-29) may be communicatively coupled to the plurality of receivers 31 and 1032 through the at least one wiring arrangement (such as the wiring arrangements 28 and 29).

In some embodiments, the at least one input device may include a microphone (such as the microphone 32A) and the at least one output device may include a loud speaker (such as the speaker 1014).

In some embodiments, the at least one wiring arrangement (such as the wiring arrangements 28 and 29) may include a plurality of jump wires (such as the cable management system 42). Further, each jump wire may include a first connector and a second connector and a conductive member connecting the first connector and the second connector. Further, the at least one wiring arrangement (such as the wiring arrangements 28 and 29) may include a plurality of jump wire connectors (such as the cable management system 42) electrically coupled to a plurality of electrical terminals corresponding to the plurality of component holders (such as, the component holders 32B and 39). Further, the plurality of jump wire connectors (such as the cable management system 42) may be configured to be electrically connected to each of the first connector and the second connector of the plurality of jump wires (such as the cable management system 42).

In some embodiments, the at least one wiring arrangement (such as the wiring arrangements 28 and 29) may include a plurality of power lines 1020-1022 electrically coupling a power terminal of each component holder to the internal power distribution network 1020-1022. Further, the plurality of power lines 1020-1022 may include a positive line and a negative line.

Further, the at least one wiring arrangement (such as the wiring arrangements 28 and 29) may include a plurality of receive lines (such as cable management system 42) electrically coupling a receive terminal of each component holder. Further, the plurality of receive lines (such as the cable management system 42) may be electrically coupled with the plurality of external antenna connections (such as the antenna connections 36 and 1028). Further, the at least one wiring arrangement (such as the wiring arrangements 28 and 29) may include a plurality of transmit lines electrically coupling a transmit terminal of each component holder. Further, the plurality of transmit lines may be electrically coupled with the plurality of external antenna connections (such as the antenna connections 36 and 1028).

In further embodiments, the at least one wiring arrangement (such as the wiring arrangements 28 and 29) may include a plurality of data lines (such as data/timing cable 39B) electrically coupling a data terminal of each component holder. Further, a data line (such as data/timing cable 39B) may communicate digital data from a first data terminal of the first component holder to a second data terminal of the second component holder. Further, the plurality of components may include a plurality of data cards (such as a data device 39A). Further, the first component holder may be configured to receive a first data card and the second component holder may be configured to receive a second data card. Further, the at least one wiring arrangement (such as the wiring arrangements 28 and 29) may include a plurality of timing lines (such as data/timing cable 39B) electrically coupling a timing terminal of each component holder. Further, a timing line (such as data/timing cable 39B) may communicate at least one timing signal from a first timing terminal of the first component holder to a second timing terminal of the second component holder.

In some embodiments, the plurality of component holders (such as, the component holders 32B and 39) may be configured to detachably attach with the plurality of components without a separate fastener.

In some embodiments, the plurality of component holders (such as, the component holders 32B and 39) may include at least one bracket (such as a bracket 43 shown in FIGS. 6-12) configured to be fastened with the at least one mounting plate (such as the mounting plates 12, 21) using at least one fastener.

In some embodiments, the plurality of component holders (such as, the component holders 32B and 39) may include a magnetic bracket (such as a magnet bracket 38 shown in FIG. 2) configured to be magnetically coupled to the at least one mounting plate (such as the mounting plates 12, 21).

According to some embodiments, a portable communications system 1000 is disclosed. Further, the portable communications system 1000 may include an enclosure 1002 configured to house a plurality of components (such as power sources, transceivers, receivers, antenna, sound cards, data devices, cables and devices). Further, the enclosure 1002 may include a plurality of sidewalls 1004-1010 forming an interior space. Further, the plurality of sidewalls 1004-1010 may be water resistant and impact resistant.

Further, the portable communications system 1000 may include at least one frame (such as frames 12A, 12B, 44) attached to at least one inner surface of the plurality of sidewalls 1004-1010.

Further, the portable communications system 1000 may include at least one mounting plate (such as mounting plates 12, 21) attached to the at least one frame (such as the frames 12A, 12B, 44). Further, the at least one mounting plate (such as the mounting plates 12, 21) may be configured to mount the plurality of components.

Further, the portable communications system 1000 may include a plurality of component holders (such as the component holders 32B and 39) attached to the at least one mounting plate (such as the mounting plates 12, 21). Further, the plurality of component holders (such as the component holders 32B and 39) may be configured to detachably attach with the plurality of components. Further, the plurality of component holders (such as the component holders 32B and 39) may include a plurality of electrical terminals.

Further, the portable communications system 1000 may include at least one wiring arrangement (such as wiring arrangements 28 and 29) electrically coupled to the plurality of component holders (such as the component holders 32B and 39). Further, the at least one wiring arrangement (such as the wiring arrangements 28 and 29) forms an electrical connection between at least one first electrical terminal of a first component holder and at least one second electrical terminal of a second component holder.

Further, the at least one wiring arrangement (such as the wiring arrangements 28 and 29) may include a plurality of power lines 1020-1022 electrically coupling a power terminal of each component holder to an internal power distribution network 1020-1022. Further, the plurality of power lines 1020-1022 may include a positive line and a negative line.

Further, the at least one wiring arrangement (such as the wiring arrangements 28 and 29) may include a plurality of receive lines (such as cable management system 42) electrically coupling a receive terminal of each component holder. Further, the plurality of receive lines (such as the cable management system 42) may be electrically coupled with the plurality of external antenna connections (such as the antenna connections 36 and 1028).

Further, the at least one wiring arrangement (such as the wiring arrangements 28 and 29) may include a plurality of transmit lines (such as the cable management system 42) electrically coupling a transmit terminal of each component holder. Further, the plurality of transmit lines (such as the cable management system 42) may be electrically coupled with the plurality of external antenna connections (such as the antenna connections 36 and 1028).

Further, the portable communications system 1000 may include a plurality of external antenna connections (such as the antenna connections 36 and 1028) configured to mount a plurality of external antenna (such as antenna 1026 and 1030). Further, the plurality of external antenna connections (such as the antenna connections 36 and 1028) may be disposed over at least one sidewall of the plurality of sidewalls 1004-1010. Further, the plurality of external antenna connections (such as the antenna connections 36 and 1028) may be electrically coupled to the at least one wiring arrangement (such as the wiring arrangements 28 and 29).

Further, the portable communications system 1000 may include an internal power source 1012 configured to provide electrical energy to at least one component of the plurality of components. Further, the internal power source 1012 may be attached to the at least one frame (such as the frames 12A, 12B, 44).

Further, the portable communications system 1000 may include at least one input power connector (such as an input power connector 37) configured to connect with a plurality of external power sources. Further, the at least one input power connector (such as an input power connector 37) may be electrically coupled to the at least one wiring arrangement (such as the wiring arrangements 28 and 29). Further, the at least one input power connector (such as an input power connector 37) may be disposed over at least one sidewall of the plurality of sidewalls 1004-1010.

Further, the portable communications system 1000 may include a plurality of output power connectors (such as output power connectors 26-27) configured to connect with a plurality of external electrical loads. Further, the plurality of output power connectors (such as the output power connectors 26-27) may be electrically coupled to the at least one wiring arrangement (such as the wiring arrangements 28 and 29). Further, the plurality of output power connectors (such as the output power connectors 26-27) may be disposed over at least one sidewall of the plurality of sidewalls 1004-1010.

Further, the portable communications system 1000 may include a power selector switch 1 electrically coupled with each of the at least one input power connector (such as an input power connector 37), the plurality of output power connectors (such as the output power connectors 26-27), the internal power source 1012 and the internal power distribution network 1020-1022. Further, the power selector switch 1 may be configured to selectively connect at least one of the at least one input power connector (such as an input power connector 37) and the internal power source 1012 with at least one of the plurality of output power connectors (such as the output power connectors 26-27) and the internal power distribution network 1020-1022. Further, the at least one wiring arrangement (such as the wiring arrangements 28 and 29) may include the internal power distribution network 1020-1022.

Further, the portable communications system 1000 may include at least one power converter (such as a transformer 30) configured to convert electrical power from a first voltage level to a second voltage level. Further, the at least one power converter (such as the transformer 30) may be electrically coupled to the at least one input power connector (such as an input power connector 37) and the internal power distribution network 1020-1022.

Further, the portable communications system 1000 may include a plurality of power meters 1016 configured to measure a plurality of power consumptions corresponding to the plurality of components. Further, the plurality of power meters 1016 may be configured to present a plurality of indications corresponding to the plurality of power consumptions. Further, the plurality of power meters 1016 may be electrically coupled to the internal power distribution network 1020-1022.

Further, the portable communications system 1000 may include a plurality of antenna 1024-1026 configured to intercept radio waves corresponding to a plurality of frequency bands. Further, the plurality of antenna 1024-1026 may be configured to be detachably attached to the plurality of component holders (such as the component holders 32B and 39).

Further, the portable communications system 1000 may include a plurality of receivers 31 and 1032 communicatively coupled to the plurality of antenna 1024-1026 through the at least one wiring arrangement (such as the wiring arrangements 28 and 29). Further, the plurality of receivers 31 and 1032 may be configured to receive signals based on the interception of the radio waves. Further, the plurality of receivers 31 and 1032 may be configured to be detachably attached to the plurality of component holders (such as the component holders 32B and 39).

Further, the portable communications system 1000 may include a plurality of transmitters 31 and 1032 communicatively coupled to the plurality of antenna 1024-1026 through the at least one wiring arrangement (such as the wiring arrangements 28 and 29). Further, the plurality of transmitters 31 and 1032 may be configured to transmit signals over the plurality of frequency bands through the plurality of antenna 1024-1026. Further, the plurality of transmitters may be configured to be detachably attached to the plurality of component holders (such as the component holders 32B and 39).

Further, the portable communications system 1000 may include at least one input device (such as a microphone 32A) configured to receive input from a user. Further, the at least one input device (such as the microphone 32A) may be configured to be detachably attached to the plurality of component holders (such as the component holders 32B and 39). Further, the at least one input device (such as the microphone 32A) may be communicatively coupled to the plurality of transmitters 31 and 1032 through the at least one wiring arrangement (such as the wiring arrangements 28 and 29).

Further, the portable communications system 1000 may include at least one output device (such as a speaker 1014, and LED lighting elements 28-29) configured to present output to the user. Further, the at least one output device (such as the speaker 1014, and the LED lighting elements 28-29) may be configured to be detachably attached to the plurality of component holders (such as the component holders 32B and 39). Further, the at least one output device (such as the speaker 1014, and the LED lighting elements 28-29) may be communicatively coupled to the plurality of receivers 31 and 1032 through the at least one wiring arrangement (such as the wiring arrangements 28 and 29).

According to some embodiments, a communication system in a box with data capability is disclosed. FIGS. 1-30 depict an example of a communications system 1000 in a box base and cover according to various embodiments. The box is designed to utilize many different power sources, transceivers, receivers, antenna, sound cards, data devices, cables and devices. Such devices may be replaced or exchanged to meet changing demands.

Referring now to FIG. 1, an element 1 is a double-pole double-throw on-off-on illuminated rocker switch that allows a user to select one of three options, one option is off in the center position. The other two options are power sources, position 1 element 30 internal power supply 12-volt, is mounted in the interior of the communications in a box to an element 21. Position 2 element 26/27 is attached to the exterior of a frame side wall of the box. An external power supply 12-volt may be provided by others. Further, energizing elements 30 or 26/27 feed in parallel the transceiver and a digital meter element 14 also feeding a first switch inline element 16. Turning on the element 16 will energize the accessory devices elements 18, 20, 22, 23, 25. Switching on an element 18 will allow the user to turn on the internal lighting element 29.

The element 1 is wired in such a manner that utilizing the switch as a transfer switch to select the position 1 element 30 will illuminate elements 8/9 when power is present.

Selecting position two elements 26/27 will illuminate elements 10/11 when power is present. Typically used with a rocker switch holder element 1A, the rocker switch holder is mounted in an element 12 panel mounting plate. The element 12 is mounted to 12A/12B with 6×32×¾-inch panhead screws. An element 12A panel mounting plate ell bracket are ¾×1½×½-inch mounted with 6×32×¾-inch panhead screws to an element 41 frame. An element 12B panel mounting plate ell bracket are ¾×1½×½-inch mounted with 6×32×¾-inch panhead screws to the element 41 frame insert.

Further, the wires 2 and 3 are the common load conductors to the element 14. Both have 8-inch leads. The digital meter utilizes the negative circuit to calculate the amperage usage. An element 2 is negative load side uses an 8-inch wire with female spade connector to an element 2A also with a female spade connector used in metering voltage, amperage, wattage and power totals. An element 3 is the positive load side 8-inch wire crimped with a female spade connector to an element 3A junction point butt splice connector. The positive wiring harness is intended to be crimped in and out of 3, 3A, 3B/3C, 3C/3D. (Order 8-inch, 8-inch, 8-inch, 4-inch, respectively.) The element 3 is crimped at one end of the butt splice. The element 3B 8-inch and the element 3C 8-inch are crimped together in the opposite end of butt splice. The element 3C 8-inch and the element 3D 4-inch use female spade connectors crimped together to the opposite end of 3A. The element 3B is a connection point powerpole 8-inch wire from elements 3A to 31B transceiver. The element 3C is a connection point feed 8-inch wire for the meter element 14, crimped in and out with a female spade connector to 3D, feedout to switch the element 3D. The element 3D is a connection point feed 4-inch wire for the switch element 16, crimped in with a female spade connector.

Further, the elements 4 and 5 are the internal feed conductors from the element 30 mounted to the element 21 inside the communication systems in the box base element 41. The element 4 is a negative switch feed connection wire 8-inch to an element 4A junction point, through an element 4B fuse connection other end to the element 30 internal 12-volt power supply connection line side. The element 4 goes to elements 4A other end to 4B which is an automotive inline blade fuse holder 10-inch which has a male spade connector that plugs into 4A female spade connector. The other end of fuse connects to the element 30 with fork crimp terminal. The element 4 is using a female spade connector 8-inch wire crimped with 4-inch jumper wire to the element 8 indicator light also with a female spade connector. The element 5 is a positive switch feed connection wire 8-inch to an element 5A junction point, through an element 5B fuse connection other end to the element 30 internal 12-volt power supply connection line side. The element 5 goes to the elements 5A other end to 5B which is an automotive inline blade fuse holder 10-inch which has a male spade connector that plugs into 5A female spade connector. The other end of fuse connects to the element 30 with fork crimp terminal. The element 5 is using a female spade connector 8-inch wire crimped with 4-inch jumper wire, to the element 9 indicator light also with a female spade connector.

Further, the elements 6 and 7 are the external feed conductors from the elements 26/27 mounted through the side of the frame of the communication systems in the box base 41. The element 6 is a negative switch feed connection wire 8-inch to an element 6A junction point, through an element 6B fuse connection other end to the element 26 external 12-volt power supply connection line side. The element 6 goes to the element 6A other end to 6B which is an automotive inline blade fuse holder 10-inch which has a male spade connector that plugs into 6A female spade connector. The other end of fuse connects to 26 with a ring terminal. The element 6 is using a female spade connector 8-inch wire crimped with 4-inch jumper wire, to the element 10 indicator light also with a female spade connector. The element 7 is a positive switch feed connection wire 8-inch to an element 7A junction point, through an element 7B fuse connection other end to element 27 external 12-volt power supply connection line side. The element 7 goes to the element 7A other end to 7B which is an automotive inline blade fuse holder 10-inch which has a female spade connector that plugs into 7A female spade connector. The other end of fuse connects to 27 with a ring terminal. The element 7 is using a female spade connector 8-inch wire crimped with 4-inch jumper wire, to an element 11 indicator light also with a female spade connector.

Now referring to FIGS. 1, 5, 19, 20-26, the element 12 depicts a panel mounting plate that is mounted by 6×32×¾-inch panhead screws to 12A/12B ell brackets ¾×1½×½-inch of FIGS. 19-24. 12A Ell brackets are mounted to the element 41 base frame left sidewall, the element 12B mounted to a frame insert both with 6×32×¾-inch panhead screws. Three of the bracket secure down element 12, left front corner is used as a stabilizer bracket as there is no hole drilled into the mounting plate. The element 12 holds the device and trim plate for elements 1A, 13, 24, 25, an element 13 holds the device for elements 14, 16, 18, 20, 22, 23. Mounted with 6×32×¾-inch panhead screws.

Further, the element 14 depicts a device, digital multimeter 12-volt for metering voltage and amperage, device configured to be secured to the element 13. The element 14 has male spade terminals for wiring details see elements 3C, 2A, 15.

Further, the element 15 illustrates a wire connection point to the digital meter element 14 negative load side, crimped in and out with a female spade connector to elements 15A 8-inch and 15B 4-inch. The negative wiring harness is intended to be crimped in and out of 15, 15A, 15B, 15C, 15D, 15E, 15F, 15G, 15H (Order 8-inch, 4-inch, 4-inch, 4-inch, 4-inch, 4-inch, 8-inch, 8-inch, respectively.) The element 15A is a device wiring connection point 8-inch to powerpole connector from the element 15 other end to 31B transceiver tee connector adaptor. The element 15B is a wiring connection point 4-inch to a rocker switch on/off 16, crimped in and out with a female spade connector to 15C. The element 15C is a wiring connection point 4-inch to switch on/off 18, crimped in and out with a female spade connector to 15D. The element 15D is a wiring connection point 4-inch wire to powerpole panel mount 22, crimped in and out with a female spade connector to 15E. The element 15E is a wiring connection point 4-inch wire to 12-volt power socket 23, crimped in and out with a female spade connector to 15F. The element 15F is a wiring connection point 4-inch wire to the USB charging port 20, crimped in and out with a female spade connector to 15G. The element 15G is a wiring connection point 8-inch to panel mount binding post 24, crimped in and out with a ring terminal connector to 15H. The element 15H is a wiring junction point to a LED lighting element 28 36-inch wire. This is crimped with the element 15H female spade connector to the element 28 male spade connector to light load wires.

Further, the element 16 is a rocker switch device on/off. Used for turning on and off the feed to the rest of the panel element 12. The element 16 has male spade terminals, and is configured to be secured to the mounting trim element 13. This is the first switch in line from the element 14.

Further, an element 17 shows a wire connection point to the first switch element 16, this is the positive load side 4-inch jumper to an element 17A. The positive wiring harness is intended to be crimped with female spade connectors in and out of 17, 17A, 17B, 17C, 17D, 17E. (Order 4-inch, 4-inch, 4-inch, 4-inch, 8-inch, respectively.) The element 17A is a wiring connection point 4-inch to switch 18 crimped in and out with a female spade connector to 17B. The element 17B is a wiring connection point 4-inch to panel mount powerpole 22 crimped in and out with a female spade connector to 17C. The element 17C is a wiring connection point 4-inch to 12-volt power socket 23 crimped in and out with a female spade connector to 17D. The element 17D is a wiring connection point 4-inch to USB charging port 20 crimped in and out with a female spade connector to 17E. The element 17E is a wiring connection point 8-inch to panel mount binding post 25 crimped with ring terminal connector.

Further, the element 18 is a rocker switch device on/off. Used for turning on and off lights mounting in an element frame 40. The element 18 has male spade terminals, is configured to be secured to the mounting trim element 13.

Further, an element 19 shows a wiring connection point 8-inch to a junction point element 19A, this is the positive load side for the LED lights. The element 19 wire has a female spade connector intended to plug into 19A. The element 19A is a wiring junction point to LED lighting element 29 36-inch wire. This is crimped with the element 19A female spade connector to the element 29 male spade connector to light load wires.

Further, the element 20 is a USB charging station, used for standard USB connections, the element 20 has male spade terminals, 20 is configured to be secured to the mounting trim element 13. Now referring to FIGS. 1, 5, 27, 28, the element 21 is a mounting plate base configured to set into the element 41 communication system in a box base. This mounting base plate will hold the element 30, the transformer is mounted to an element 44 by four ell bracket 1"×1" that are mount by four 8×32×¾ panhead screws. Depending on which transceiver is being used an element 31 or 43 will also be mounted to 21 by four 8×32×¾ inch panhead screws. Depending on which transceiver is being used, elements 31A or 32B will be mounted to 21 with three 6×32×½ inch panhead screws.

Further, the element 22 shows a device powerpole panel mount unit, the element 22 has 2×3-inch positive wires crimped together with a male spade connector and 2×3-inch negative wires crimped together with a male spade connector, the element 22 is configured to be secured to the panel mounting plate element 13.

Further, the element 23 is a device power socket 12-volt panel mount unit, Used for 12-volt plug-in accessories. The element 23 has male spade terminals, 23 is configured to be secured to the mounting trim element 13.

Further, the elements 24 and 25 are a set of binding post feed out conductors from 17E/15G, mounted to the element 12. Used for 12-volt accessories. The element 24 is a 6M×1×40M binding post or jack panel mount, negative 8-inch wire with ring terminal connector configured to attach to the panel mounting plate element 12. The element 25 is a 6M×1×40M binding post or jack panel mount, positive 8-inch wire with ring terminal connector configured to attach to the panel mounting plate element 12.

Further, the elements 26 and 27 are a set of external binding post feed in conductors mounted to the side of the frame of the communication systems in the box base 41. Used for externally supplied 12-volt power connection. The element 26 is a 6M×1×40M binding post or jack base mount, negative 8-inch wire with ring terminal connector configured to attach to the element 41. The element 27 is a 6M×1×40M binding post or jack panel mount, positive 8-inch wire with ring terminal connector configured to attach to the element 41.

Further, the elements 28 and 29 form a set of light load conductors from the element 15H/19A, mounted to the element 40. The element 28 is a (LED light) fixture negative 36-inch load jumper wire from 15H. The element 28 has a male spade connector connection to 15H female spade connection configured to attach to the cover frame 40. The element 29 is a (LED light) fixture positive 36-inch load jumper wire from 19A. The element 29 has a male spade connector connection to 19A female spade connection configured to attach to the cover frame 40.

Further, the element 30 is an internally mounted transformer 120/240-volt AC to 12 volts DC 30 amps, uses fork terminal connectors configured to attach to the element 21 base mounting plate.

Further, the element 31 is a device transceiver option, internally mounted to the element 21. The element 31 typically comes with a tee connector, use an adaptor tee connector to powerpole. The element 31 connects to 3B, 15A by the powerpoles. configured to attach to the element 21 base mounting plate. The element 31A is a device transceiver remote radiohead option, internally mounted to be configured to attach to 21 base mounting plate. An element 31B is a device transceiver power tee connection point, optional configured to connect to the element 3B/15A. An element 31C is the internally mounted transceiver antenna connection point, for element 31. An element 31D is the internally mounted transceiver data port connection point, for the element 31.

Now referring to FIGS. 2, 4, 13, 14, 15, 16, 17, 18, an element 32 is an ell bracket ½×2×2¾-inch for a mounting element 32B microphone holder mounted with 6×32×⅜-inch panhead screws configured to attach to the box cover frame 40. An element 32A is a microphone option, configured to attach to the 32B microphone holder. The element 32B is a microphone holder configured to attach with 6×32×⅜-inch panhead screws to a microphone mounting ell bracket. An element 32C is either the element 31 remoted radiohead mount or the element 32B that is the base mounting plate 41 option depending on the transceiver be used with a remoted head or without.

Now referring to FIG. 1, an element 33 is an external grounding stud connection point 8×32×1½-inch configured to attach through exterior of the 41 communication system box frame.

Further, an element 34 is a wiring connection point 4-inch interior ground jumper connection to the element 33 grounding, the element 33 external grounding stud. Crimped out with ring terminal connector to 34A. The grounding wiring harness is intended to be crimped with ring terminal connectors in and out of 34, 34A, 34B, 34C, 34D, configured to attach to the communication system box frame 41 and 21 base mounting plate (Order 4-inch; 22-inch; 8-inch; 4-inch, respectively). The element 34A is a wiring connection point 4-inch interior ground jumper connection to an element 35, a grounding element 36 antenna bulkhead connector. Crimped in and out with ring terminal connector to 34B. Configured to attach to the element 41 communication system box frame. The element 34B is a wiring connection point 22-inch interior ground jumper connection to an element 35A, grounding element 30 transformer. Crimped in and out with ring terminal connector to 34C. Configured to attach to the element 21 communication system box frame. The element 34C is a wiring connection point 8-inch interior ground jumper connection to an element 35B, the grounding element 32C alternate mounting option. Crimped in and out with ring terminal connector to 34D. Configured to attach to the element 21 communication system box frame. The element 34D is a wiring connection point 4-inch interior ground jumper connection to an element 35C, grounding the element 31 transceiver. Crimped in with ring terminal connector. Configured to attach to the element 21 communication system box frame.

Further, the element 35 depicts an interior grounding stud location for grounding connection element 36 antenna bulkhead connector, configured to attach to the element 41 communication system box frame. The element 35A depicts an interior grounding stud location for grounding connection element 30 transformer configured to attach to the element 21 base mounting plate. The element 35B depicts an interior grounding stud location for the grounding connection element 32C alternate location element 31A remote head or the element 32B microphone holder configured to attach to the element 21 base mounting plate. The element 35C depicts an interior grounding stud location for grounding connection the element 31 transceiver configured to attach to the element 21 base mounting plate.

Further, the element 36 depicts an antenna bulkhead connector exterior mount, mounted with 6×32×½ inch panhead screws configured to attach to the element 41 communication system in a box base frame. An element 36A depicts an antenna connection cable 24-inch configured to attach between the elements 36/31C.

Further, an element 37 depicts wiring for line voltage power socket 15-inch with 3-inch jumper wire mounted with 6×32×¾-inch panhead screws using female spade connectors. See factory wiring diagram. The element 37 is for powering the element 30 using fork crimp connections. The element 37 configured to attach to 41 communication system box frame.

Now referring to FIGS. 2, 4, 13, 14, 15, 16, 17, 18, an element 38 is an ell bracket mounting plate ½×2×2¾-inch for storing magnetic antenna base mounted with 6×32×⅜-inch panhead screws configured to attach to the element 40 communication system in a box cover frame. An element 38A depicts a magnetic mount antenna option, configured to magnetically attach to the 38 mounting ell bracket.

Now referring to FIGS. 2, 4, 13, 14, 15, 16, 17, 18, an element 39 is an ell bracket mounting plate ½×2×2¾-inch for holding data device mounted with 6×32×⅜-inch panhead screws configured to attach to 40 communication system in a box cover frame. An element 39A depicts a data device option, configured to mount in the 39 ell bracket. Configured to attach to 40 communication system in a box cover frame. An element 39B is a data cable option configured to connect between elements 31D and 39A options.

The element 40 (in FIG. 2) depicts an example of communication system in a box cover configured to encompasses fixtures, devices, and mounting plates.

The element 41 (in FIG. 1) depicts an example of communication system in a box base configured to encompasses fixtures, devices, and mounting plates.

An element 42 (in FIG. 2) depicts a wire management system connection points configured to attach 10-inch to the element 41 communication system in a box cover frame.

Now referring to FIGS. 1, 5, 6, 7, 8, 9, 10, 11, 12, an element 43 depicts an example transceiver mounting bracket 3½×3½×5¾-inch mounted with 6×32×½-inch panhead screws configured to attach to the element 21 communication system in a box base mounting plate. The element 30 mounts to the top of 43 with 6×32×½-inch panhead screws.

Now referring to FIGS. 1, 5, 6, 7, 8, 9, 10, 11, 12, the element 44 shows an example of ell brackets 1×1×½-inch mounted with 8×32×¼-inch panhead screws to the side of the element 30 transformer, then the bottom to the element 21 this is mounted with 8×32×½-inch panhead screws configured to attach to 21. The element 44 mounts to the frame of 41.

In FIGS. 29, 30, an element 45 depicts a top view and a side view of an example of tabletop platform configured to set into the element 41. The element 45 dimension is 7×11³⁄₁₆-inch×¼-inch.

Referring to FIG. 1, the element 1 depicts a top view of one example of a double-pole double-throw on-off-on illuminated rocker switch with 10 male spade terminals may be configured with one or more attachment elements mounted in a plate or panel board, according to various embodiments of the present disclosure.

Further, the element 1A shows an example of a Rocker switch holder may be configured with one or more attachment elements mounted in a plate or panel board, according to various embodiments of the present disclosure.

Further, the element 2 depicts an example of a top view of a double-pole double-throw switch negative load male spade terminal 8-inch wire to the element 2A according to various embodiments described herein. The element 2 negative load side uses an 8-inch wire with female spade connector to the element 2A also with a female spade connector used in metering voltage, amperage, wattage and power totals.

Further, the element 2A depicts an example of a top view of a feed connection to the element 14 has a male spade terminal, 8-inch wire from the element 2 according to various embodiments described herein.

Further, the element 3 depicts an example of a top view of a double-pole double-throw switch positive load male spade terminal 8-inch wire according to various embodiments described herein.

Further, the element 3A shows an example of a top view of a Junction point butt splice positive direct feed to transceiver, 3 to 3A/3C, buttspliced with 3B fuse to 31B. The element 3C crimped with 3D with female spade connector, feed wiring harness according to various embodiments described herein. (Order 8-inch, 8-inch, 8-inch, 4-inch, respectively.)

Further, the element 3B shows an example of a top view of a device powerpole connector connection point 8-inch wire from 3A other end to the 31B transceiver tee connector according to various embodiments described herein.

Further, the element 3C shows an example of a top view connection point 8-inch wire feed for meter 14, crimped with feedout 4-inch wire to switch 3D according to various embodiments described herein.

Further, the element 3D shows an example of a top view connection point 4-inch wire feed for switch 16 according to various embodiments described herein.

Further, the element 4 shows an example of a top view of a double-pole double-throw switch negative feed connection, male spade terminal, used for 31 Internal 12-volt power supply, 8-inch wire crimped with the 4-inch wire element 8 according to various embodiments described herein.

Further, the element 4A shows an example of a top view of a connection point from 4 to 4B fuse other end to the element 30. This is 4A male spade connector to 4B female spade connector connection point according to various embodiments described herein.

Further, the element 4B shows an example of a top view of a Fuse holder negative 10-inch, from 4A to 30 internal power This is 4A male spade connector to 4B female spade connector connection point, the element 4B female spade connector to 30 is a fork crimp connector according to various embodiments described herein.

Further, the element 5 shows an example of a top view of a double-pole double-throw switch positive feed connection, male spade terminal, used for 31 Internal 12-volt power supply, 8-inch wire crimped with the 4-inch wire element 9 according to various embodiments described herein.

Further, the element 5A shows an example of a top view of a connection point from 5 to 5B fuse other end to the element 30. This is 5A male spade connector to 5B female spade connector connection point according to various embodiments described herein.

Further, the element 5B shows an example of a top view of a Fuse holder positive 10-inch, from 5A to 30 internal power This is 4A male spade connector to 4B female spade connector connection point, the element 5B female spade connector to 30 is a fork crimp connector according to various embodiments described herein.

Further, the element 6 shows an example of a top view of a double-pole double-throw switch negative feed connection, male spade terminal, used for 26 external 12-volt power supply, 8-inch wire crimped with the 3-inch wire element 10 according to various embodiments described herein.

Further, the element 6A shows an example of a top view of a connection point from 6 to 6B fuse other end to the element 26. This is from 6A male spade connector to 6B female spade connector connection point according to various embodiments described herein. Further, the element 6B shows an example of a top view of a Fuse holder negative 10-inch, from 6A to 26 external power. This is 6A male spade connector to 6B female spade connector connection point, the element 7B female spade connector to 27 is a ring terminal connector according to various embodiments described herein.

Further, the element 7 shows an example of a top view of a double-pole double-throw switch positive feed connection, male spade terminal. Used for 27 external 12-volt power supply, 8-inch wire crimped with the 4-inch wire element 11 according to various embodiments described herein.

Further, the element 7A shows an example of a top view of a connection point from 7 to 7B fuse other end to element 27. This is 7A male spade connector to 7B female spade connector connection point according to various embodiments described herein.

Further, the element 7B shows an example of a top view of a Fuse holder positive 10-inch, from 7A to 27 external power. This is 7A male spade connector to 7B female spade connector connection point, the element 7B female spade connector to 27 is a ring terminal connector according to various embodiments described herein.

Further, the element 8 shows an example of a top view of a double-pole double-throw switch pilot light, male spade terminal, used with internal power supply 12-volt negative line side 3-inch wire crimped with the element 4 female spade connector according to various embodiments described herein.

Further, the element 9 shows an example of a top view of a double-pole double-throw switch pilot light, male spade terminal. Used for internal power supply 12-volt positive line side 3-inch wire crimped with the element 5 female spade connector according to various embodiments described herein.

Further, the element 10 shows an example of a top view of a double-pole double-throw switch pilot light, male spade terminal, used with external power supply 12-volt negative line side 3-inch wire crimped with the element 6 female spade connector according to various embodiments described herein.

Further, the element 11 shows an example of a top view of a double-pole double-throw switch pilot light, male spade terminal, used with external power supply 12-volt positive line side 3-inch wire crimped with the element 7 female spade connector according to various embodiments described herein.

Referring to FIGS. 1, 5, 25, 26, the element 12 depicts a top view of an example of panel mounting plate configured to attach to the elements 12A/12B with 6×32×¾-inch panhead screws according to various embodiments described herein.

Referring to FIGS. 1, 5, 19, 20, 21, 22, 23, 24, the element 12A shows an example of a top view panel mounting plate left ell bracket ¾×1½×½-inch mounted with 6×32×¾-inch panhead screws configured to attach to the 41 base frame according to various embodiments described herein.

Referring to FIGS. 1, 5, 19, 20, 21, 22, 23, 24, the element 12B shows an example of a top view panel mounting plate right ell bracket ¾×1½×½-inch mounted with 6×32×¾-inch panhead screws configured to attach to the 41 base frame insert according to various embodiments described herein.

Further, the element 13 depicts a top view of an example of mounting trim plate 6 port device holder mounted with 6×32×¾-inch panhead screws according to various embodiments described herein.

Further, the element 14 depicts an example of a top view of a device digital multimeter 12-volt for metering voltage and amperage male spade terminals configured to be secured to the element 13 mounting trim plate according to various embodiments described herein.

Further, the element 15 shows an example of a top view connection point to digital meter 14 negative load, male spade terminal according to various embodiments described herein. The negative wiring harness is intended to be crimped with female spade connectors in and out of elements 15, 15A, 15B, 15C, 15D, 15E, 15F, 15G, 15H. (Order 8-inch, 4-inch, 4-inch, 4-inch, 4-inch, 4-inch, 8-inch, 8-inch, respectively.)

Further, the element 15A shows an example of a top view of a device powerpole connector connection point 8-inch wire from the element 15 other end to the 31B transceiver tee connector according to various embodiments described herein.

Further, the element 15B shows an example of a top view of a male spade terminal connection point, 4-inch wire to the switch on/off element 16 according to various embodiments described herein.

Further, the element 15C shows an example of a top view of a male spade terminal connection point, 4-inch wire to the switch on/off element 18 according to various embodiments described herein.

Further, the element 15D shows an example of a top view of a male spade connector connection point, 4-inch wire to the powerpole panel mount element 22 according to various embodiments described herein.

Further, the element 15E shows an example of a top view of a male spade terminal connection point, 4-inch to the 12-volt power socket element 23 according to various embodiments described herein.

Further, the element 15F shows an example of a top view of a male spade terminal connection point, 4-inch to the USB charging port element 20 according to various embodiments described herein.

Further, the element 15G shows an example of a top view of a connection point, 8-inch wire to the binding post panel mount element 24, ring terminal connector according to various embodiments described herein.

Further, the element 15H shows an example of a top view of a junction point from the element 15G 8-inch wire to the element 28 36-inch wire. The element 15H is a female spade connector to the element 28 male spade connector connection point according to various embodiments described herein.

Further, the element 16 depicts an example of a top view of a device rocker switch on/off for panel power with male spade terminals configured to be secured to the element 13 mounting trim plate according to various embodiments described herein.

Further, the element 17 shows an example of a top view of a male spade terminal connection point, 4-inch wire from the switch element 16 positive load according to various embodiments described herein. The positive wiring harness is intended to be crimped with female spade connectors in and out; elements 17A, 17B, 17C, 17D, 17E. (Order 4-inch, 4-inch, 4-inch, 4-inch, 8-inch.)

Further, the element 17A shows an example of a top view of a male spade terminal connection point, 4-inch wire to the switch on/off element 18 according to various embodiments described herein.

Further, the element 17B shows an example of a top view of a male spade connector connection point, 4-inch wire to the powerpole panel mount element 22 according to various embodiments described herein.

Further, the element 17C shows an example of a top view of a male spade terminal connection point, the 4-inch to 12-volt power socket element 23 according to various embodiments described herein.

Further, the element 17D shows an example of a top view of a male spade terminal connection point, 4-inch to the USB charging port element 20 according to various embodiments described herein.

Further, the element 17E shows an example of a top view of a ring terminal connector connection point, 8-inch wire to binding post panel mount according to various embodiments described herein.

Further, the element 18 depicts an example of a top view of a device rocker switch on/off for led light with male spade terminals configured to be secured to the element 13 mounting trim plate according to various embodiments described herein.

Further, the element 19 illustrates an example of a top view of a male spade terminal connection point, 8-inch to LED light positive load to the element 19A other end to element 29 according to various embodiments described herein.

Further, the element 19A shows an example of a top view of a junction point, 36-inch from the element 19 to the element 29. This is from element 19A male spade connector to the element 29 female spade connector connection point according to various embodiments described herein.

Further, the element 20 shows an example of a top view of a device USB charging station with male spade terminals configured to attach to the element 13 mounting trim plate according to various embodiments described herein.

Further, the element 21 depicts an example of a top view base mounting plate configured to set in to the element 41 communication system in a box base according to various embodiments described herein.

Further, the element 22 illustrates an example of a top view device powerpole panel mount 2×3-inch positive, 2×3-inch negative with male spade connection configured to be secured to the element 13 mounting trim plate according to various embodiments described herein.

Further, the element 23 depicts an example of a top view of a device power socket 12-volt with male spade terminals configured to be secured to the element 13 mounting trim plate according to various embodiments described herein.

Further, the element 24 shows an example of a top view of a device binding post 6M×1×40M panel mount negative 8-inch wire with ring terminal connection configured to attach to the element 12 panel mounting plate according to various embodiments described herein.

Further, the element 25 shows an example of a top view of a device binding post 6M×1×40M panel mount positive 8-inch wire with ring terminal connection configured to attach to the element 12 panel mounting plate according to various embodiments described herein.

Further, the element 26 shows an example of a top view of a device external mount binding post or jack, 6M×1×40M negative 8-inch wire with ring terminal connection configured to attach to the element 41 communication system box base according to various embodiments described herein.

Further, the element 27 illustrates an example of a top view of a device external mount binding post or jack, 6M×1×40M positive 8-inch wire with ring terminal connection configured to attach to the element 41 communication system box base according to various embodiments described herein.

In FIG. 2, the element 28 depicts an example of a top view of a (LED light) fixture negative 36-inch load jumper wire from 15H. The element 28 has a male spade connector connection to 15H female spade connection configured to attach to the cover frame 40 according to various embodiments described herein.

In FIG. 2, the element 29 depicts an example of a top view of a (LED light) fixture positive 36-inch load jumper wire from 19A. Element 29 has a male spade connector connection to 19A female spade connection configured to attach to the cover frame 40 according to various embodiments described herein.

Further, the element 30 depicts an example of a top view device internal mount power supply 12-volt, used with fork terminal connections configured to attach to the element 21 base mounting plate according to various embodiments described herein.

Further, the element 31 illustrates an example of a top view device transceiver option internal mount configured to attach to the element 21 base mounting plate according to various embodiments described herein.

Further, the element 31A illustrates an example of a top view device transceiver remote radiohead option internal mount configured to attach to the element 21 base mounting plate according to various embodiments described herein.

Further, the element 31B illustrates an example of a top view device transceiver power, tee connection option to powerpole connectors 3B, 15A configured to attach to the element 21 base mounting plate according to various embodiments described herein.

Further, the element 31C illustrates an example of a top view device transceiver antenna connection option internal mount configured to attach to 21 base mounting plate according to various embodiments described herein.

Further, the element 31D illustrates an example of a top view device transceiver data port connection option internal mount configured to attach to mounting panel according to various embodiments described herein.

In FIGS. 2, 4, 13, 14, 15, 16, 17, 18, the element 32 illustrates an example of a top view microphone mounting ell bracket ½×2×2¾-inch mounted with 6×32×⅜-inch panhead screws configured to attach to box cover frame according to various embodiments described herein.

In FIG. 2, the element 32A illustrates an example of a top view device microphone option configured to mount on to the 32B microphone holder according to various embodiments described herein.

In FIGS. 1-2, the element 32B illustrates an example of a top view microphone holder configured to attach with 6×32×⅜-inch panhead screws to the element 32 microphone mounting ell bracket or the element 21 base mounting plate according to various embodiments described herein.

Further, the element 32C illustrates an example of a top view Alternate mounting option 31A/32B configured to attach to the element 21 base mounting plate according to various embodiments described herein.

Further, the element 33 shows an example of a top view external grounding stud connection 8×32×1½-inch configured to attach through of exterior of the 41 communication system box according to various embodiments described herein.

Further, the element 34 illustrates an example of a top view interior grounding jumper connection. The grounding wiring harness is intended to be crimped with ring terminal connectors in and out; 34, 34A, 34B, 34C, 34D, configured to attach to the 41 communication system box frame and 21 base mounting plate according to various embodiments described herein. Order; 4-inch; 22-in; 8-inch; 4-inch.

Further, the element 34A illustrates an example of a top view interior ground jumper connection to 36 antenna bulkhead connector configured to attach to a communication system box frame according to various embodiments described herein.

Further, the element 34B illustrates an example of a top view interior ground jumper connection to 30 transformer configured to attach to a communication system box mounting panel according to various embodiments described herein.

Further, the element 34C illustrates an example of a top view interior ground jumper connection to 31A remote head or 32B microphone holder configured to attach to a communication system box mounting panel according to various embodiments described herein.

Further, the element 34D illustrates an example of a top view interior ground jumper connection to the 31 transceiver configured to attach to a communication system box mounting pane 1 according to various embodiments described herein.

Further, the element 35 depicts an example of a top view interior grounding stud connection 36 to antenna bulkhead connector configured to attach to a communication system box frame according to various embodiments described herein.

Further, the element 35A illustrates an example of a top view interior grounding stud connection to 30 transformer configured to attach to the element 21 base mounting plate according to various embodiments described herein.

Further, the element 35B illustrates an example of a top view interior grounding stud connection to remote head or the 32B microphone holder configured to attach to the element 21 base mounting plate according to various embodiments described herein.

Further, the element 35C illustrates an example of a top view interior grounding stud connection configured to transceiver attach to the element 21 base mounting plate according to various embodiments described herein.

Further, the element 36 depicts an example of a top view antenna bulkhead connector exterior mount mounted with 6×32×½-inch panhead screws configured to attach to the 41 communication system in a box frame according to various embodiments described herein.

Further, the element 36A depicts an example of a top view antenna connection cable 24-inch configured to attach to 36/36A according to various embodiments described herein.

Further, the element 37 shows an example of a top view device line voltage power socket 15-inch with 3-inch jumper wire mounted with 6×32×¾-inch panhead screws has male spade terminals, for powering the element 30 configured to attach to the 41 communication system box frame according to various embodiments described herein.

In FIGS. 2, 4, 13, 14, 15, 16, 17, 18, the element 38 depicts an example of a top view ell bracket mounting plate ½×2×2¾-inch mounted with 6×32×⅜-inch panhead screws for storing the 38A magnetic antenna base configured to attach to the element 40 communication system in a box cover frame according to various embodiments described herein.

In FIG. 2, the element 38A depicts an example of a top view device magnetic mount antenna option configured to attach to 38 mounting ell bracket according to various embodiments described herein.

In FIGS. 2,4, 13, 14, 15, 16, 17, 18, the element 39 illustrates an example of a top view ell bracket mounting plate ½×2×2¾-inch mounted with 6×32×⅜-inch panhead screws for 39A data device configured to attach to the element 40 communication system in a box cover frame according to various embodiments described herein.

In FIG. 2, the element 39A illustrates an example of a top view data device option configured to mount in 39 according to various embodiments described herein.

In FIG. 2, the element 39B illustrates an example of a top view data cable option configured to attach to 39A according to various embodiments described herein.

In FIG. 2, the element 40 shows an example of a top view communication system in a box cover configured to encompass fixtures, devices, and mounting plates according to various embodiments described herein.

In FIG. 1, the element 41 shows an example of a top view communication system in a box base configured to encompass fixtures, devices, and mounting plates according to various embodiments described herein.

In FIG. 2, the element 42 shows an example of a top view wire management system connection points for attaching 10-inch bungee cords used for holding associated cables with 40/41 configured to attach to communication system in a box cover frame according to various embodiments described herein.

In FIGS. 1, 5, 6, 7, 8, 9, 10, 11, 12, the element 43 shows an example of a top view transceiver mounting ell bracket 3½×3½×5¾-inch mounted with 6×32×½-inch panhead screws configured to attach to 21. The element 30 mounts to the top of 43 with 6×32×½-inch panhead screws according to various embodiments described herein.

In FIGS. 1, 5, 6, 7, 8, 9, 10, 11, 12, the element 44 shows an example of a top view ell brackets 1×1×½-inch mounted with 8×32×¼-inch panhead screws to the side of the element 30 transformer, then the bottom to the element 21 this is mounted with 8×32×½-inch panhead screws configured to attach to 21. The element 44 mounts to the frame of 41 according to various embodiments described herein.

The element 45 depicts a top view of an example of tabletop platform configured to set into the element 41. The element 45 dimension is 7×11 3/16×¼-inch according to various embodiments described herein.

According to some embodiments, a preassembled portable communication system is disclosed. The portable communication system includes an impact resistant, wet rated carrying case with optional digital communication capability, that offers protection, portability, reliability and mounting capabilities that accepts and receives a variety transceivers and accessories. This system may be rapidly reconfigured and interchanged to adapt to different environments and unforeseen events, where the devices and equipment are designed to be modified, removed and/or changed out in the field. Further, the preassembled portable communication system may be placed in a box. Further, the portable communication system may include an optional digital communication capability. Further, the portable communication system may include an impact resistant, wet rated carrying case (box), that offers protection, portability, reliability. Further, the portable communication system may include metering and monitors devices utilizing power, with communication devices fed in parallel. Further, the portable communication system may be rapidly reconfigured to where the devices and equipment are designed to be interchanged, modified, removed and/or changed out in the field. Further, the portable communication system may have mounting capabilities that accepts and receives a variety transceivers and accessories. Further, the portable communication system may have mounting capabilities that accepts and receives a variety of external antenna connections. Further, the portable communication system may have mounting capabilities that accepts and receives a variety of digital communication. Further, the portable communication system may include an external mount, line voltage power socket 110-240 volt 15-20-amp AC. Further, the portable communication system may include a 12 volt 20-amp DC voltage external power connection. Further, the portable communication system may offer 12-volt power outputs to for multiple 12-volt device types. Further, the portable communication system may include a double-pole double-throw rocker master selector switch.

In some embodiments, an unassembled portable communications system in a box kit is disclosed. The unassembled portable communications system may include an optional digital communication capability. The unassembled portable communications system may include an impact resistant, wet rated carrying case (box), that offers protection, portability, reliability. The unassembled portable communications system may include a metering and monitors devices utilizing power, with communication devices fed in parallel. The unassembled portable communications system may be rapidly reconfigured to where the devices and equipment are designed to be interchanged, modified, removed and/or changed out in the field. Further, the unassembled portable communications system may have mounting capabilities that accepts and receives a variety transceivers and accessories. Further, the unassembled portable communications system may have mounting capabilities that accepts and receives a variety of external antenna connections. Further, the unassembled portable communications system may have mounting capabilities that accepts and receives a variety of digital communication. Further, the unassembled portable communications system may include an external mount, line voltage power socket 110-240 volt 15-20-amp AC. Further, the unassembled portable communications system may include a 12 volt 20-amp DC voltage external power connection. Further, the unassembled portable communications system may offer 12-volt power outputs for multiple device types. Further, the unassembled portable communications system may include a double-pole double-throw rocker master selector switch.

The disclosed portable communications system may be used in any emergency, when communications are vital to keeping safe, secure, and resilient. When an incident occurs, the need to communicate is immediate. Many different audiences must be reached with information specific to their interests and needs. Friends and their families will be concerned and want information. No emergency evacuation plan is complete without covering the critical component of communication. Having the disclosed portable communications system in an impact resistant, wet rated carrying case with voice and or digital capability UHF/VHF HF frequency will help users to have access to the information they need when they need it. Further, a communication plan may be used to ensure that information is delivered, and received, in the most efficient, effective way.

Depending on the nature of the event as well as the specifics of circumstances, one of the earliest decisions during an emergency is whether to shelter-in-place or evacuate. If local officials advise to evacuate, then their instructions should be followed. Having the disclosed portable communications system in an impact resistant, wet rated carrying case with voice and or digital capability UHF/VHF HF frequency will help users with communications in either situation. The initial moments surrounding an emergency event are crucial. After all, if the situation is deemed unsafe, the assembled portable communications system may be used with a predetermined communication plan.

Although the present disclosure has been explained in relation to its preferred embodiment, it is to be understood that many other possible modifications and variations can be made without departing from the spirit and scope of the disclosure.

The following is claimed:
1. A portable communications system comprising:
an enclosure configured to house a plurality of components, wherein the enclosure comprises a plurality of sidewalls forming an interior space, wherein the plurality of sidewalls is water resistant and impact resistant;
a plurality of component holders attached to the enclosure, wherein the plurality of component holders is configured to detachably attach with the plurality of components, wherein the plurality of component holders comprises a plurality of electrical terminals configured to electrically contact with a plurality of component terminals comprised in the plurality of components;
at least one wiring arrangement electrically coupled to the plurality of component holders, wherein the at least one wiring arrangement forms an electrical connection between at least one first electrical terminal of a first component holder and at least one second electrical terminal of a second component holder;
an internal power source configured to provide electrical energy to at least one component of the plurality of components, wherein the internal power source is attached to the enclosure;

at least one input power connector configured to connect with a plurality of external power sources, wherein the at least one input power connector is electrically coupled to the at least one wiring arrangement, wherein the at least one input power connector is disposed over at least one sidewall of the plurality of sidewalls;

a plurality of output power connectors configured to connect with a plurality of external electrical loads, wherein the plurality of output power connectors is electrically coupled to the at least one wiring arrangement, wherein the plurality of output power connectors is disposed over at least one sidewall of the plurality of sidewalls;

a power selector switch electrically coupled with each of the at least one input power connector, the plurality of output power connectors, the internal power source and an internal power distribution network, wherein the power selector switch is configured to selectively connect at least one of the at least one input power connector and the internal power source with at least one of the plurality of output power connectors and the internal power distribution network, wherein the at least one wiring arrangement; comprises the internal power distribution network at least one power converter configured to convert electrical power from a first voltage level to a second voltage level, wherein the at least one power converter is electrically coupled to the at least one input power connector and the internal power distribution network;

at least one transceiver comprising a plurality of antenna, wherein the at least one transceiver is configured to receive signals and transmit signals, wherein the at least one transceiver is configured to be detachably attached to the plurality of component holders;

at least one input device configured to receive input from a user, wherein the at least one input device is configured to be detachably attached to the plurality of component holders, wherein the at least one input device is communicatively coupled to the at least one transceiver through the at least one wiring arrangement; and at least one output device configured to present output to the user, wherein the at least one output device is configured to be detachably attached to the plurality of component holders, wherein the at least one output device is communicatively coupled to the at least one transceiver through the at least one wiring arrangement.

2. The portable communications system of claim 1, wherein the plurality of output power connectors comprises an external mount line voltage power socket configured to connect with an external line connector configured to connect to an Alternating Current (AC) power source and an external DC voltage power connection configured to connect with an external Direct Current (DC) power source.

3. The portable communications system of claim 1, wherein the power selector switch comprises a double-pole double-throw on-off-on illuminated rocker switch.

4. The portable communications system of claim 1 further comprises:
at least one frame attached to at least one inner surface of the plurality of sidewalls; and
at least one mounting plate attached to the at least one frame, wherein the at least one mounting plate is configured to mount the plurality of components, wherein the plurality of component holders is attached to the at least one mounting plate.

5. The portable communications system of claim 4, wherein the plurality of component holders comprises at least one bracket configured to be fastened with the at least one mounting plate using at least one fastener.

6. The portable communications system of claim 4, wherein the plurality of component holders comprises a magnetic bracket configured to be magnetically coupled to the at least one mounting plate.

7. The portable communications system of claim 1 further comprising a plurality of power meters configured to measure a plurality of power consumptions corresponding to the plurality of components, wherein the plurality of power meters is further configured to present a plurality of indications corresponding to the plurality of power consumptions, wherein the plurality of power meters is electrically coupled to the internal power distribution network.

8. The portable communications system of claim 1, wherein the at least one wiring arrangement comprises:
a plurality of jump wires, wherein each jump wire comprises a first connector and a second connector and a conductive member connecting the first connector and the second connector; and
a plurality of jump wire connectors electrically coupled to a plurality of electrical terminals corresponding to the plurality of component holders, wherein the plurality of jump wire connectors is configured to be electrically connected to each of the first connector and the second connector of the plurality of jump wires.

9. The portable communications system of claim 1, wherein the at least one wiring arrangement comprises:
a plurality of power lines electrically coupling a power terminal of each component holder to the internal power distribution network, wherein the plurality of power lines comprises a positive line and a negative line;
a plurality of receive lines electrically coupling a receive terminal of each component holder, wherein the plurality of receive lines is further electrically coupled with the plurality of external antenna connections; and
a plurality of transmit lines electrically coupling a transmit terminal of each component holder, wherein the plurality of transmit lines is further electrically coupled with the plurality of external antenna connections.

10. The portable communications system of claim 9, wherein the at least one wiring arrangement further comprises:
a plurality of data lines electrically coupling a data terminal of each component holder, wherein a data line communicates digital data from a first data terminal of the first component holder to a second data terminal of the second component holder, wherein the plurality of components comprises a plurality of data cards, wherein the first component holder is configured to receive a first data card and the second component holder is configured to receive a second data card; and
a plurality of timing lines electrically coupling a timing terminal of each component holder, wherein a timing line communicates at least one timing signal from a first timing terminal of the first component holder to a second timing terminal of the second component holder.

11. A portable communications system comprising:
an enclosure configured to house a plurality of components, wherein the enclosure comprises a plurality of sidewalls forming an interior space, wherein the plurality of sidewalls is water resistant and impact resistant;

at least one frame attached to at least one inner surface of the plurality of sidewalls;

at least one mounting plate attached to the at least one frame, wherein the at least one mounting plate is configured to mount the plurality of components;

a plurality of component holders attached to the at least one mounting plate, wherein the plurality of component holders is configured to detachably attach with the plurality of components, wherein the plurality of component holders comprises a plurality of electrical terminals;

at least one wiring arrangement electrically coupled to the plurality of component holders, wherein the at least one wiring arrangement forms an electrical connection between at least one first electrical terminal of a first component holder and at least one second electrical terminal of a second component holder;

a plurality of external antenna connections configured to mount a plurality of external antenna, wherein the plurality of external antenna connections is disposed over at least one sidewall of the plurality of sidewalls, wherein the plurality of external antenna connections is electrically coupled to the at least one wiring arrangement;

an internal power source configured to provide electrical energy to at least one component of the plurality of components, wherein the internal power source is attached to the at least one frame;

at least one input power connector configured to connect with a plurality of external power sources, wherein the at least one input power connector is electrically coupled to the at least one wiring arrangement, wherein the at least one input power connector is disposed over at least one sidewall of the plurality of sidewalls;

a plurality of output power connectors configured to connect with a plurality of external electrical loads, wherein the plurality of output power connectors is electrically coupled to the at least one wiring arrangement, wherein the plurality of output power connectors is disposed over at least one sidewall of the plurality of sidewalls;

a power selector switch electrically coupled with each of the at least one input power connector, the plurality of output power connectors, the internal power source and an internal power distribution network, wherein the power selector switch is configured to selectively connect at least one of the at least one input power connector and the internal power source with at least one of the plurality of output power connectors and the internal power distribution network, wherein the at least one wiring arrangement; comprises the internal power distribution network at least one power converter configured to convert electrical power from a first voltage level to a second voltage level, wherein the at least one power converter is electrically coupled to the at least one input power connector and the internal power distribution network;

a plurality of power meters configured to measure a plurality of power consumptions corresponding to the plurality of components, wherein the plurality of power meters is further configured to present a plurality of indications corresponding to the plurality of power consumptions, wherein the plurality of power meters is electrically coupled to the internal power distribution network;

a plurality of antenna configured to intercept radio waves corresponding to a plurality of frequency bands, wherein the plurality of antenna is configured to be detachably attached to the plurality of component holders;

a plurality of receivers communicatively coupled to the plurality of antenna through the at least one wiring arrangement, wherein the plurality of receivers is configured to receive signals based on the interception of the radio waves, wherein the plurality of receivers is configured to be detachably attached to the plurality of component holders;

a plurality of transmitters communicatively coupled to the plurality of antenna through the at least one wiring arrangement, wherein the plurality of transmitters is configured to transmit signals over the plurality of frequency bands through the plurality of antenna, wherein the plurality of transmitters is configured to be detachably attached to the plurality of component holders;

at least one input device configured to receive input from a user, wherein the at least one input device is configured to be detachably attached to the plurality of component holders, wherein the at least one input device is communicatively coupled to the plurality of transmitters through the at least one wiring arrangement; and at least one output device configured to present output to the user, wherein the at least one output device is configured to be detachably attached to the plurality of component holders, wherein the at least one output device is communicatively coupled to the plurality of receivers through the at least one wiring arrangement.

12. The portable communications system of claim 11, wherein the enclosure comprises a box comprising a base and a cover, wherein the at least one frame comprises a base frame attached to the base and a cover frame attached to the cover, wherein the at least one mounting plate comprises a base mounting plate attached to the base frame and a cover mounting plate attached to the cover frame.

13. The portable communications system of claim 11, wherein the at least one wiring arrangement comprises:
   a plurality of jump wires, wherein each jump wire comprises a first connector and a second connector and a conductive member connecting the first connector and the second connector; and
   a plurality of jump wire connectors electrically coupled to a plurality of electrical terminals corresponding to the plurality of component holders, wherein the plurality of jump wire connectors is configured to be electrically connected to each of the first connector and the second connector of the plurality of jump wires.

14. The portable communications system of claim 11, wherein the at least one wiring arrangement comprises:
   a plurality of power lines electrically coupling a power terminal of each component holder to the internal power distribution network, wherein the plurality of power lines comprises a positive line and a negative line;
   a plurality of receive lines electrically coupling a receive terminal of each component holder, wherein the plurality of receive lines is further electrically coupled with the plurality of external antenna connections; and
   a plurality of transmit lines electrically coupling a transmit terminal of each component holder, wherein the plurality of transmit lines is further electrically coupled with the plurality of external antenna connections.

15. The portable communications system of claim 14, wherein the at least one wiring arrangement further comprises:
- a plurality of data lines electrically coupling a data terminal of each component holder, wherein a data line communicates digital data from a first data terminal of the first component holder to a second data terminal of the second component holder, wherein the plurality of components comprises a plurality of data cards, wherein the first component holder is configured to receive a first data card and the second component holder is configured to receive a second data card; and
- a plurality of timing lines electrically coupling a timing terminal of each component holder, wherein a timing line communicates at least one timing signal from a first timing terminal of the first component holder to a second timing terminal of the second component holder.

16. The portable communications system of claim 11, wherein the at least one input device comprises a microphone and the at least one output device comprises a loud speaker.

17. The portable communications system of claim 11, wherein the plurality of component holders is configured to detachably attach with the plurality of components without a separate fastener.

18. The portable communications system of claim 11, wherein the plurality of component holders comprises at least one bracket configured to be fastened with the at least one mounting plate using at least one fastener.

19. The portable communications system of claim 11, wherein the plurality of component holders comprises a magnetic bracket configured to be magnetically coupled to the at least one mounting plate.

20. A portable communications system comprising:
- an enclosure configured to house a plurality of components, wherein the enclosure comprises a plurality of sidewalls forming an interior space, wherein the plurality of sidewalls is water resistant and impact resistant;
- at least one frame attached to at least one inner surface of the plurality of sidewalls;
- at least one mounting plate attached to the at least one frame, wherein the at least one mounting plate is configured to mount the plurality of components;
- a plurality of component holders attached to the at least one mounting plate, wherein the plurality of component holders is configured to detachably attach with the plurality of components, wherein the plurality of component holders comprises a plurality of electrical terminals;
- at least one wiring arrangement electrically coupled to the plurality of component holders, wherein the at least one wiring arrangement forms an electrical connection between at least one first electrical terminal of a first component holder and at least one second electrical terminal of a second component holder, wherein the at least one wiring arrangement comprises:
  - a plurality of power lines electrically coupling a power terminal of each component holder to an internal power distribution network, wherein the plurality of power lines comprises a positive line and a negative line;
  - a plurality of receive lines electrically coupling a receive terminal of each component holder, wherein the plurality of receive lines is further electrically coupled with the plurality of external antenna connections; and
  - a plurality of transmit lines electrically coupling a transmit terminal of each component holder, wherein the plurality of transmit lines is further electrically coupled with the plurality of external antenna connections;
- a plurality of external antenna connections configured to mount a plurality of external antenna, wherein the plurality of external antenna connections is disposed over at least one sidewall of the plurality of sidewalls, wherein the plurality of external antenna connections is electrically coupled to the at least one wiring arrangement;
- an internal power source configured to provide electrical energy to at least one component of the plurality of components, wherein the internal power source is attached to the at least one frame;
- at least one input power connector configured to connect with a plurality of external power sources, wherein the at least one input power connector is electrically coupled to the at least one wiring arrangement, wherein the at least one input power connector is disposed over at least one sidewall of the plurality of sidewalls;
- a plurality of output power connectors configured to connect with a plurality of external electrical loads, wherein the plurality of output power connectors is electrically coupled to the at least one wiring arrangement, wherein the plurality of output power connectors is disposed over at least one sidewall of the plurality of sidewalls;
- a power selector switch electrically coupled with each of the at least one input power connector, the plurality of output power connectors, the internal power source and the internal power distribution network, wherein the power selector switch is configured to selectively connect at least one of the at least one input power connector and the internal power source with at least one of the plurality of output power connectors and the internal power distribution network, wherein the at least one wiring arrangement comprises the internal power distribution network;
- at least one power converter configured to convert electrical power from a first voltage level to a second voltage level, wherein the at least one power converter is electrically coupled to the at least one input power connector and the internal power distribution network;
- a plurality of power meters configured to measure a plurality of power consumptions corresponding to the plurality of components, wherein the plurality of power meters is further configured to present a plurality of indications corresponding to the plurality of power consumptions, wherein the plurality of power meters is electrically coupled to the internal power distribution network;
- a plurality of antenna configured to intercept radio waves corresponding to a plurality of frequency bands, wherein the plurality of antenna is configured to be detachably attached to the plurality of component holders;
- a plurality of receivers communicatively coupled to the plurality of antenna through the at least one wiring arrangement, wherein the plurality of receivers is configured to receive signals based on the interception of the radio waves, wherein the plurality of receivers is configured to be detachably attached to the plurality of component holders;
a plurality of transmitters communicatively coupled to the plurality of antenna through the at least one wiring arrangement, wherein the plurality of transmitters is configured to transmit signals over the plurality of frequency bands through the plurality of antenna, wherein the plurality of transmitters is configured to be detachably attached to the plurality of component holders;
at least one input device configured to receive input from a user, wherein the at least one input device is configured to be detachably attached to the plurality of component holders, wherein the at least one input device is communicatively coupled to the plurality of transmitters through the at least one wiring arrangement; and
at least one output device configured to present output to the user, wherein the at least one output device is configured to be detachably attached to the plurality of component holders, wherein the at least one output device is communicatively coupled to the plurality of receivers through the at least one wiring arrangement.

* * * * *